United States Patent
Click et al.

(10) Patent No.: US 11,724,961 B2
(45) Date of Patent: Aug. 15, 2023

(54) WHITE GLASS-CERAMIC SUBSTRATES AND ARTICLES INCLUDING TETRAGONAL ZIRCONIA CRYSTALLINE PHASE, AND METHOD OF MANUFACTURING THE SAME

(71) Applicant: CORNING INCORPORATED, Corning, NY (US)

(72) Inventors: Carol Ann Click, Corning, NY (US); Qiang Fu, Painted Post, NY (US); Mathieu Gerard Jacques Hubert, Corning, NY (US); Charlene Marie Smith, Corning, NY (US); Alana Marie Whittier, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 12 days.

(21) Appl. No.: 17/358,818

(22) Filed: Jun. 25, 2021

(65) Prior Publication Data
US 2021/0403373 A1    Dec. 30, 2021

Related U.S. Application Data

(60) Provisional application No. 63/045,934, filed on Jun. 30, 2020.

(51) Int. Cl.
*C03C 10/00* (2006.01)
*C03C 21/00* (2006.01)
*C03C 4/02* (2006.01)

(52) U.S. Cl.
CPC ............ *C03C 10/0027* (2013.01); *C03C 4/02* (2013.01); *C03C 10/0036* (2013.01); *C03C 21/002* (2013.01); *C03C 21/005* (2013.01)

(58) Field of Classification Search
CPC ... C03C 10/0027; C03C 4/02; C03C 10/0036; C03C 21/002; C03C 21/005
See application file for complete search history.

(56) References Cited

U.S. PATENT DOCUMENTS

7,476,633 B2    1/2009  Comte et al.
8,664,130 B2    3/2014  Beall et al.
(Continued)

FOREIGN PATENT DOCUMENTS

WO    2015/034860 A1    3/2015
WO    WO-2017223551 A1 *  12/2017    ............ A61K 6/024

OTHER PUBLICATIONS

Apel et al., "Influence of ZrO2 on the crystallization and properties of lithium disilicate glass-ceramics derived from a multi-component system", J Eur Ceram Soc, 2007, 27:1571-1577.
(Continued)

*Primary Examiner* — Karl E Group
*Assistant Examiner* — Cameron K Miller
(74) *Attorney, Agent, or Firm* — Travis B. Gasa; Kapil Banakar

(57) ABSTRACT

A glass-ceramic article comprises: a center-volume composition comprising (on an oxide basis): 55-75 mol % $SiO_2$; 0.2-10 mol % $Al_2O_3$; 0-5 mol % $B_2O_3$; 15-30 mol % $Li_2O$; 0-2 mol % $Na_2O$; 0-2 mol % $K_2O$; 0-5 mol % MgO; 0-2 mol % ZnO; 0.2-3.0 mol % $P_2O_5$; 0.1-10 mol % $ZrO_2$; 0-4 mol % $TiO_2$; and 0-1.0 mol % $SnO_2$. Lithium disilicate and either β-spodumene or β-quartz are the two predominant crystalline phases (by weight) of the glass-ceramic article. The glass-ceramic article further comprises tetragonal $ZrO_2$ as a crystalline phase. The composition of the glass-ceramic article from a primary surface into a thickness of the glass-ceramic article can comprise over 10 mol % $Na_2O$ (on an oxide basis), with the mole percentage of $Na_2O$ decreasing from the primary surface towards the center-volume. The glass-ceramic article exhibits a ring-on-ring load-to-failure of at least 120 kgf, when the thickness of the glass-ceramic article is 0.3 mm to 2.0 mm.

18 Claims, 15 Drawing Sheets

(56) References Cited

U.S. PATENT DOCUMENTS

| | | |
|---|---|---|
| 9,701,573 B2 | 7/2017 | Beall et al. |
| 2016/0152512 A9 * | 6/2016 | Beall .................. C03C 10/0054 501/4 |
| 2020/0055764 A1 | 2/2020 | Duffy et al. |

OTHER PUBLICATIONS

International Search Report and Written Opinion of the International Searching Authority; PCT/US2021/039343; dated Sep. 30, 2021; 13 pages; European Patent Office.

Fischer et al., "Chemical strengthening of a dental lithium disilicate glass-ceramic material", Journal on Biomedical Materials Research, vol. 87A, 2008, pp. 582-587.

Fu et al., "Nature-inspired design of strong, tough glass-ceramics", In MRS bulletin, vol. 42, 2017, pp. 220-225.

Hannink et al., "Transformation Toughening in Zirconia-Containing Ceramics", Journal of American Ceramic Society, vol. 83, 2000, pp. 461-487.

Holand et al., "Glass-ceramic Technology", The American Ceramic Society, 2012, 19 pages.

Karolina et al., "Glass-ceramics of LAS ($Li_2O$—$Al_2O_3$—$SiO_2$) system enhanced by ion-exchange in $KNO_3$ salt bath", Journal of Non-Crystalline Solids, vol. 428, 2015, pp. 90-97.

Tagantsev, "Decrystallization of glass-ceramics under ion exchange diffusion", Journal of European Ceramic Society, vol. 19, 1999, pp. 1555-1558.

\* cited by examiner

WHITE GLASS-CERAMIC SUBSTRATES AND ARTICLES INCLUDING TETRAGONAL ZIRCONIA CRYSTALLINE PHASE, AND METHOD OF MANUFACTURING THE SAME

RELATED APPLICATIONS

This application claims the benefit of priority to U.S. Provisional Application No. 63/045,934, filed Jun. 30, 2020, the contents of which are incorporated herein in their entirety.

BACKGROUND

Glass-ceramic materials that appear opaque and white in color have been utilized as cooktop plates, cooking utensils, and in mobile devices (such as smart phones) among other things. However, there is a problem in that these glass-ceramic materials have less than optimal mechanical properties, in particular less than optimal damage resistance and fracture toughness.

SUMMARY

The present disclosure addresses that problem with glass-ceramic substrates having a $SiO_2$—$Al_2O_3$—$Li_2O$—$P_2O_5$—$ZrO_2$ composition, lithium disilicate and either β-spodumene solid solution or β-quartz solid solution as the two predominant crystalline phases, and tetragonal $ZrO_2$ as an additional crystalline phase. The glass-ceramic substrates are ion-exchanged into glass-ceramic articles having particular $Na_2O$ concentration as a function of thickness profiles. The glass-ceramic articles, even when having a thickness of 0.3 mm to 2.0 mm, exhibit exceptional mechanical performance. For example, the glass-ceramic articles (after being subjected to an ion-exchange procedure) exhibit a ring-on-ring load-to-failure of at least 120 kgf, and, after being abraded with SiC particles at an abrasion pressure of 45 psi, a ring-on-ring load-to-failure of at least 80 kgf. β-spodumene solid solution is hereinafter referred to simply as "β-spodumene." β-quartz solid solution is hereinafter referred to simply as "β-quartz."

According to aspect (1), a method of manufacturing a glass-ceramic article is provided. The method comprises: (a) maintaining a precursor glass in an environment for a first time period of 1.75 to 4.25 hours while the environment has a first temperature of 590° C. to 820° C., the precursor glass having a composition comprising, on an oxide basis: 55-75 mol % $SiO_2$; 0.2-10 mol % $Al_2O_3$; 0-5 mol % $B_2O_3$; 15-30 mol % $Li_2O$; 0-2 mol % $Na_2O$; 0-2 mol % $K_2O$; 0-5 mol % MgO; 0-2 mol % ZnO; 0.2-3.0 mol % $P_2O_5$; 0.1-10 mol % $ZrO_2$; 0-4 mol % $TiO_2$; and 0-1.0 mol % $SnO_2$; (b) maintaining the precursor glass in the environment for a second time period of 0.75 hour to 4.25 hours while the environment has a second temperature of 850° C. to 925° C., forming a glass-ceramic substrate, wherein (i) lithium disilicate and (ii) either β-spodumene or β-quartz are the two predominant crystalline phases by weight percentage of the glass-ceramic substrate, and wherein tetragonal $ZrO_2$ is a crystalline phase of the glass-ceramic substrate; and (c) subjecting the glass-ceramic substrate to an ion-exchange treatment in a molten salt bath that comprises a salt of one or more of ionic Na, K, and Ag, forming a glass-ceramic article; wherein at least one of the following conditions is true: (i) the composition of the precursor glass was characterized by $Na_2O+K_2O≤0.5$ mol %, but sodium ions are present throughout an entire thickness of the glass-ceramic article; (ii) the composition of a portion of the glass-ceramic article from a primary surface into the thickness comprises over 10 mol % $Na_2O$, on an oxide basis; (iii) the bath of the ion-exchange treatment comprises greater than 98 percent by weight $NaNO_3$ and 0.01 to 1 percent by weight $LiNO_3$; and the mole percentage of $Na_2O$ within the glass-ceramic article decreases as a function of depth into the thickness of the glass-ceramic article from the primary surface, with the maximum mole percentage of $Na_2O$ at any depth being 7 mol % $Na_2O$, and sodium ions are present within the glass-ceramic article to a depth of at least 15 percent of the thickness from the primary surface; and (iv) the ion-exchange treatment comprises a first ion-exchange treatment in which a first bath comprises at least 98 percent by weight $NaNO_3$ and a second ion-exchange step in which a second bath comprises ions of potassium or silver; and (i) a first portion of the thickness of the glass-ceramic article comprises a mole percentage of either $K_2O$ or $Ag_2O$ that is greater than the mole percentage of $Na_2O$ and (ii) a second portion of the thickness of the glass-ceramic article comprises a mole percentage of $Na_2O$ that is greater than the mole percentage of either $K_2O$ or $Ag_2O$.

According to aspect (2), the method of aspect (1) is provided, wherein: the precursor glass was characterized by $Na_2O+K_2O≤0.5$ mol %, but sodium ions are present throughout the entire thickness of the glass-ceramic article.

According to aspect (3), the method of aspect (1) is provided, wherein: the composition of a portion of the glass-ceramic article from the primary surface into the thickness comprises over 10 mol % $Na_2O$, on an oxide basis.

According to aspect (4), the method of aspect (1) is provided, wherein the bath of the ion-exchange treatment comprises greater than 98 percent by weight $NaNO_3$ and 0.01 to 1 percent by weight $LiNO_3$; and the mole percentage of $Na_2O$ within the glass-ceramic article decreases as a function of depth into the thickness of the glass-ceramic article from the primary surface, with the maximum mole percentage of $Na_2O$ at any depth being 7 mol % $Na_2O$, and sodium ions are present within the glass-ceramic article to a depth of at least 15 percent of the thickness from the primary surface.

According to aspect (5), the method of aspect (1) is provided, wherein: the ion-exchange treatment comprises the first ion-exchange treatment in which the first bath comprises at least 98 percent by weight $NaNO_3$ and the second ion-exchange step in which the second bath comprises ions of potassium or silver; and (i) the first portion of the thickness of the glass-ceramic article comprises a mole percentage of either $K_2O$ or $Ag_2O$ that is greater than the mole percentage of $Na_2O$ and (ii) the second portion of the thickness of the glass-ceramic article comprises a mole percentage of $Na_2O$ that is greater than the mole percentage of either $K_2O$ or $Ag_2O$.

According to aspect (6), the method of any of aspects (1) to (5) is provided, wherein: the precursor glass was substantially free of $Na_2O$.

According to aspect (7), the method of any of aspects (1) to (5) is provided, wherein: the first temperature is in the range of 590° C. to 770° C.

According to aspect (8), the method of any of aspects (1) to (7) is provided, wherein: the glass-ceramic substrate has a fracture toughness of 1.0 to 3.0 MPa·m$^{1/2}$.

According to aspect (9), the method of any of aspects (1) to (8) is provided, wherein: the thickness of the glass-ceramic article is 0.3 mm to 2.0 mm.

According to aspect (10), the method of aspect (9) is provided, wherein: the glass-ceramic article exhibits a ring-on-ring load-to-failure of at least 120 kgf.

According to aspect (11), the method of aspect (9) or (10) is provided, after being abraded with SiC particles at an abrasion pressure of 45 psi, the glass-ceramic article exhibits a ring-on-ring load-to-failure of at least 80 kgf.

According to aspect (12), the method of any of aspects (1) to (11) is provided, wherein: the glass-ceramic substrate exhibits a color, under an F02 illuminant, presented in CIELAB color space coordinates: L*=88 to 98; a*=−1.0 to 1; and b*=−4.0 to 4.0.

According to aspect (13), the method of any of aspects (1) to (12) is provided, wherein: the composition of the precursor glass comprises, on an oxide basis: 68.6-71.5 mol % $SiO_2$; 1.0-4.5 mol % $Al_2O_3$; 21.5-22.2 mol % $Li_2O$; 0.7-1.2 mol % $P_2O_5$; 1.5-5.0 mol % $ZrO_2$; and 0-1.0 mol % $SnO_2$, wherein the precursor glass is substantially free of $B_2O_3$; $Na_2O$; $K_2O$; MgO; ZnO; and $TiO_2$.

According to aspect (14), the method of any of aspects (1) to (13) is provided, wherein: the composition of the precursor glass comprises, on an oxide basis: 68.6-70.9 mol % $SiO_2$; 1.0-4.3 mol % $Al_2O_3$; 21.5-22.2 mol % $Li_2O$; 0.9-1.2 mol % $P_2O_5$; 2.0-5.0 mol % $ZrO_2$; and 0-1.0 mol % $SnO_2$, wherein the precursor glass is substantially free of $B_2O_3$; $Na_2O$; $K_2O$; MgO; ZnO; and $TiO_2$.

According to aspect (15), the method of any of aspects (1) to (14) is provided, wherein: the glass-ceramic substrate has a fracture toughness of 1.4 to 2.4 MPa·m$^{1/2}$.

According to aspect (16), the method of any of aspects (1) to (15) is provided, wherein: the glass-ceramic substrate exhibits a color, under an F02 illuminant, presented in CIELAB color space coordinates: L*=93 to 97; a*=−1.0 to 0; and b*=−1.0 to 3.0.

According to aspect (17), the method of any of aspects (1) to (16) is provided, wherein: the glass-ceramic substrate has an average opacity of 79 to 96 percent throughout the wavelength range of 400 nm to 700 nm for a thickness of 0.8 mm.

According to aspect (18), the method of any of aspects (1) to (17) is provided, wherein: the precursor glass comprises 3.4 mol % to 4.3 mol % $Al_2O_3$; and lithium disilicate and β-spodumene are the two predominant crystalline phases by weight of the glass-ceramic article.

According to aspect (19), the method of any of aspects (1) to (5) and (7) to (12) is provided, wherein: the precursor glass comprises, on an oxide basis: 70.0-70.6 mol % $SiO_2$; 4.85-4.95 mol % $Al_2O_3$; 19.2-19.4 mol % $Li_2O$; 0.195-0.205 mol % $Na_2O$; 0.9-1.1 mol % $P_2O_5$; 1.8-2.6 mol % $ZrO_2$; 1.9-2.1 mol % $TiO_2$; and 0.09-0.11 mol % $SnO_2$, wherein the precursor glass is substantially free of $B_2O_3$; $K_2O$; MgO; and ZnO; and β-spodumene and lithium disilicate are the two predominant crystalline phases by weight of the glass-ceramic article.

According to aspect (20), the method of aspect (19) is provided, wherein: the glass-ceramic article further comprises rutile as a crystalline phase.

According to aspect (21), a glass-ceramic substrate is provided. The glass-ceramic substrate comprises: a composition comprising, on an oxide basis: 68.6-71.5 mol % $SiO_2$; 1.0-4.5 mol % $Al_2O_3$; 21.5-22.2 mol % $Li_2O$; 0.7-1.2 mol % $P_2O_5$; 1.5-5.0 mol % $ZrO_2$; and 0-1.0 mol % $SnO_2$; wherein (i) lithium disilicate and (ii) either β-spodumene or β-quartz are the two predominant crystalline phases by weight percentage of the glass-ceramic substrate; and wherein tetragonal $ZrO_2$ is a crystalline phase of the glass-ceramic substrate.

According to aspect (22), the glass-ceramic substrate of aspect (21) is provided, comprising: 68.6-70.9 mol % $SiO_2$; 1.0-4.3 mol % $Al_2O_3$; 0.9-1.2 mol % $P_2O_5$; and 3.0-5.0 mol % $ZrO_2$.

According to aspect (23), the glass-ceramic substrate of any of aspects (21) to (22) is provided, wherein: the composition of the glass-ceramic substrate is substantially free of $B_2O_3$; $Na_2O$; $K_2O$; MgO; $TiO_2$; and ZnO.

According to aspect (24), the glass-ceramic substrate of any of aspects (21) to (23) is provided, wherein: the glass-ceramic substrate has a fracture toughness greater than or equal to 2.2 MPa·m$^{1/2}$.

According to aspect (25), a glass-ceramic article is provided. The glass-ceramic article comprises: a composition at a center-volume comprising, on an oxide basis: 55-75 mol % $SiO_2$; 0.2-10 mol % $Al_2O_3$; 0-5 mol % $B_2O_3$; 15-30 mol % $Li_2O$; 0-2 mol % $Na_2O$; 0-2 mol % $K_2O$; 0-5 mol % MgO; 0-2 mol % ZnO; 0.2-3.0 mol % $P_2O_5$; 0.1-10 mol % $ZrO_2$; 0-4 mol % $TiO_2$; and 0-1.0 mol % $SnO_2$; wherein (i) lithium disilicate and (ii) either β-spodumene or β-quartz are the two predominant crystalline phases (by weight) of the glass-ceramic article; wherein the glass-article further comprises tetragonal $ZrO_2$ as a crystalline phase; and wherein at least one of the following conditions are true: (i) the composition of the glass-ceramic article from a primary surface into a thickness of the glass-ceramic article comprises over 10 mol % $Na_2O$, on an oxide basis, with the mole percentage of $Na_2O$ decreasing from the primary surface towards the center-volume; and (ii) the mole percentage of $Na_2O$ within the glass-ceramic article decreases as a function of depth into the thickness of the glass-ceramic article from the primary surface, with the maximum mole percentage of $Na_2O$ at any depth being 7 mol % $Na_2O$, and sodium ions are present within the glass-ceramic article to a depth of at least 15 percent of the thickness from the primary surface.

According to aspect (26), the glass-ceramic article of aspect (25) is provided, wherein the composition of the glass-ceramic article from the primary surface into the thickness of the glass-ceramic article comprises over 10 mol % $Na_2O$, with the mole percentage of $Na_2O$ decreasing from the primary surface towards the center-volume.

According to aspect (27), the glass-ceramic article of aspect (25) is provided, wherein the mole percentage of $Na_2O$ within the glass-ceramic article decreases as a function of depth into the thickness of the glass-ceramic article from the primary surface, with the maximum mole percentage of $Na_2O$ at any depth being 7 mol % $Na_2O$ and, and sodium ions are present within the glass-ceramic article to a depth of at least 15 percent of the thickness from the primary surface.

According to aspect (28), the glass-ceramic article of any of aspects (25) to (27) is provided, wherein: the thickness of the glass-ceramic article is 0.3 mm to 2.0 mm.

According to aspect (29), the glass-ceramic article of aspect (28) is provided, wherein: the glass-ceramic article exhibits a ring-on-ring load-to-failure of at least 120 kgf.

According to aspect (30), the glass-ceramic article of any of aspects (28) to (29) is provided, wherein after being abraded with SiC particles at an abrasion pressure of 45 psi, the glass-ceramic article exhibits a ring-on-ring load-to-failure of at least 80 kgf.

According to aspect (31), the glass-ceramic article of any of aspects (25) to (30) is provided, wherein: the composition of the glass-ceramic article at the center-volume comprises, on an oxide basis: 68.6-71.5 mol % $SiO_2$; 1.0-4.5 mol % $Al_2O_3$; 21.5-22.2 mol % $Li_2O$; 0.7-1.2 mol % $P_2O_5$; 1.5-5.0 mol % $ZrO_2$; and 0-0.1 mol % $SnO_2$, wherein the glass-ceramic article is substantially free of $B_2O_3$; MgO; ZnO; and $TiO_2$.

According to aspect (32), the glass-ceramic article of any of aspects (25) to (31) is provided, wherein: the composition of the glass-ceramic article at the center-volume comprises, on an oxide basis: 68.6-70.9 mol % $SiO_2$; 1.0-4.3 mol % $Al_2O_3$; 21.5-22.2 mol % $Li_2O$; 0.9-1.2 mol % $P_2O_5$; 2.0-5.0 mol % $ZrO_2$; and 0-0.1 mol % $SnO_2$, wherein the glass-ceramic article is substantially free of $B_2O_3$; MgO; ZnO; and $TiO_2$.

According to aspect (33), the glass-ceramic article of any of aspects (25) to (32) is provided, wherein: the composition of the glass-ceramic article at the center-volume comprises (on an oxide basis): 68.6-70.9 mol % $SiO_2$; 1.0-4.3 mol % $Al_2O_3$; 21.5-22.2 mol % $Li_2O$; 0.9-1.2 mol % $P_2O_5$; 3.0-5.0 mol % $ZrO_2$; and 0-1.0 mol % $SnO_2$.

According to aspect (34), the glass-ceramic article of any of aspects (25) to (33) is provided, wherein: the glass-ceramic article exhibits a color, under an F02 illuminant, presented in CIELAB color space coordinates: L*: 93 to 97; a*: −1.0 to 0; and b*: −1.0 to 3.0.

According to aspect (35), the glass-ceramic article of any of aspects (25) to (34) is provided, wherein: the glass-ceramic substrate has an average opacity of 79 to 96 percent throughout the wavelength range of 400 nm to 700 nm for a thickness of 0.8 mm.

According to aspect (36), the glass-ceramic article of any of aspects (25) to (35) is provided, wherein: the composition of the glass-ceramic article at the center-volume comprises, on an oxide basis, 3.4 to 4.3 mol % $Al_2O_3$; and lithium disilicate and β-spodumene are the two predominant by weight crystalline phases of the glass-ceramic article.

According to aspect (37), the glass-ceramic article of any of aspects (25) to (30) is provided, wherein: the composition of the glass-ceramic article at the center-volume comprises, on an oxide basis: 70.0-70.6 mol % $SiO_2$; 4.85-4.95 mol % $Al_2O_3$; 19.2-19.4 mol % $Li_2O$; 0.195-0.205 mol % $Na_2O$; 0.9-1.1 mol % $P_2O_5$; 1.8-2.6 mol % $ZrO_2$; 1.9-2.1 mol % $TiO_2$; and 0.09-0.11 mol % $SnO_2$, wherein the glass-ceramic article at the center-volume is substantially free of $B_2O_3$; $K_2O$; MgO; and ZnO; and lithium disilicate and β-spodumene are the two predominant crystalline phases by weight of the glass-ceramic article.

According to aspect (38), the glass-ceramic article of aspect (37) is provided, wherein: the glass-ceramic article further comprises rutile as a crystalline phase.

BRIEF DESCRIPTION OF THE DRAWINGS

Referring to the drawings in general, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

DETAILED DESCRIPTION

Figure 1:
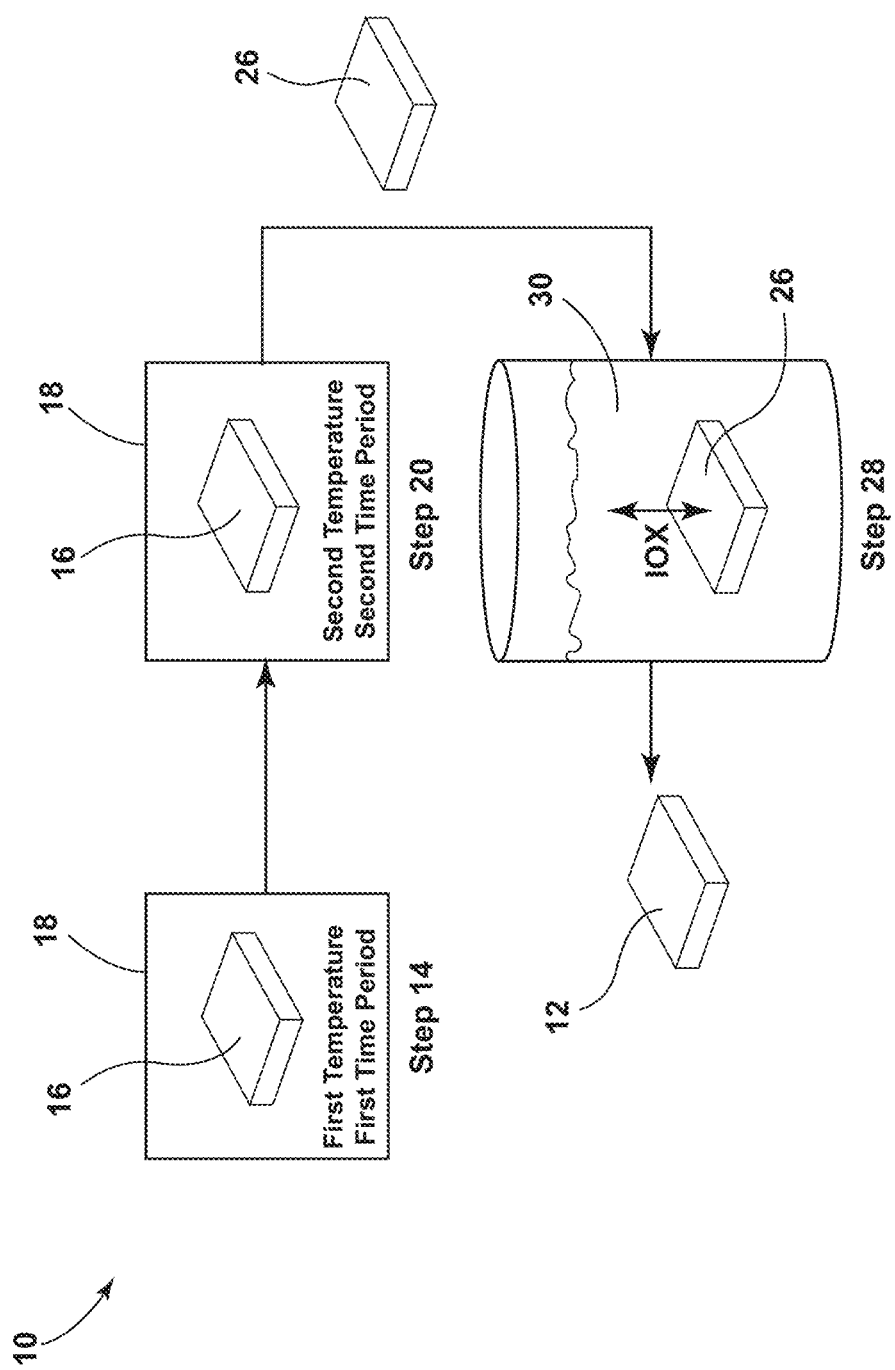
FIG. 1 is a flow and schematic diagram of a method of manufacturing a glass-ceramic article according to embodiments of this disclosure.
Figure 2:
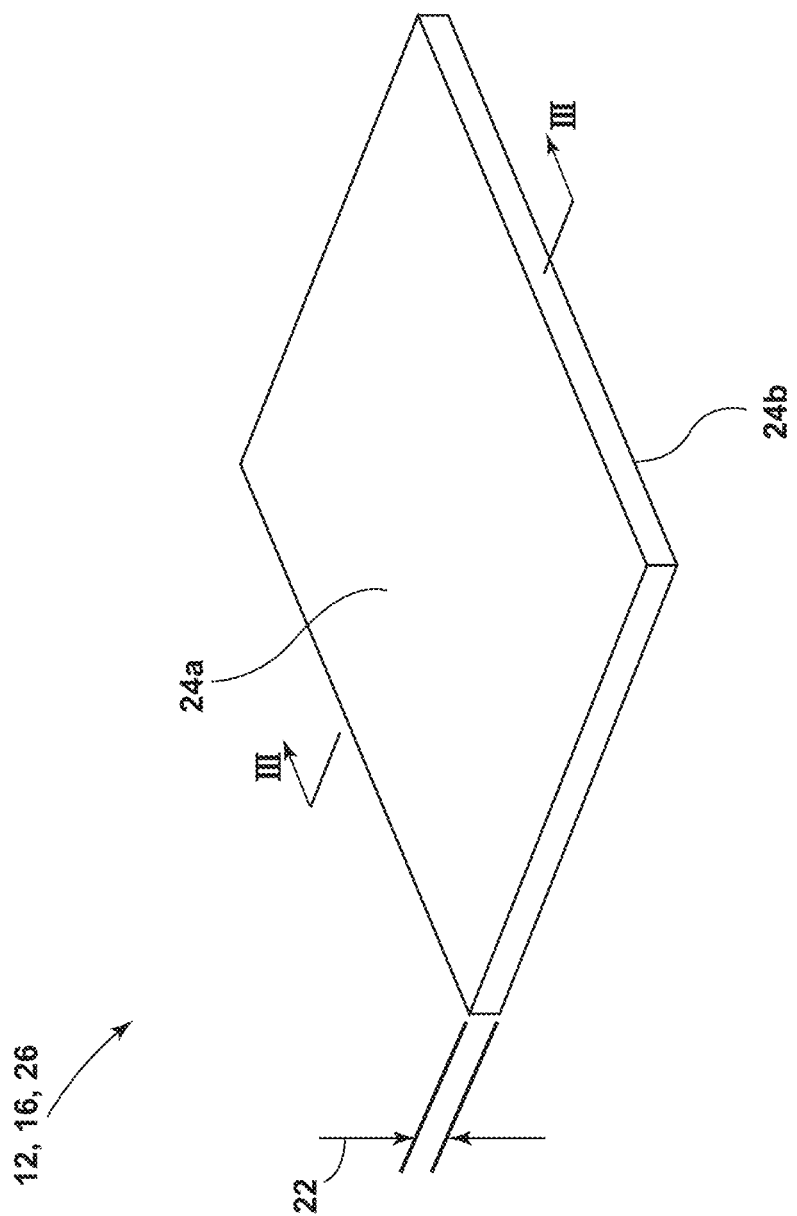
FIG. 2 is a perspective view of embodiments of a precursor glass, glass-ceramic substrate, and glass-ceramic article of the present disclosure.
Figure 3:
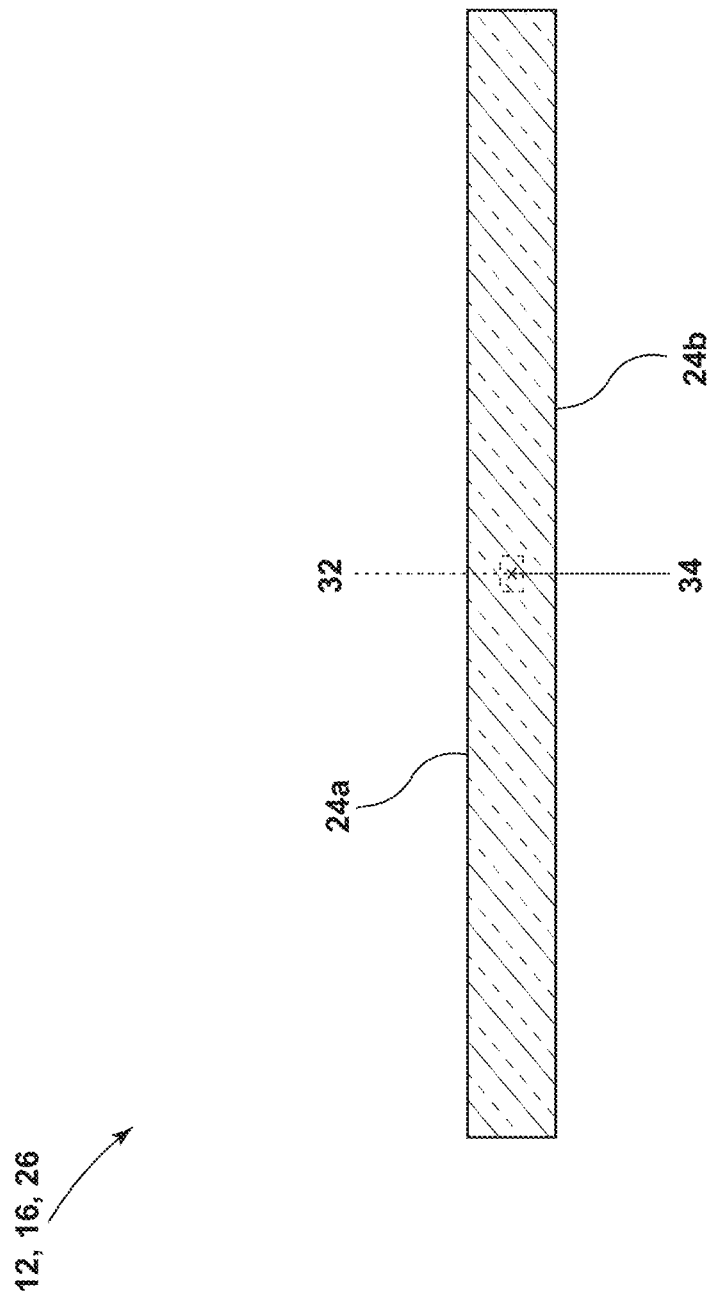
FIG. 3 is an elevational view of a cross-section of the precursor glass, glass-ceramic substrate, and glass-ceramic article of FIG. 2 taken through line of FIG. 2.

Referring now to FIGS. 1-3, a method 10 of manufacturing a glass-ceramic article 12 is herein described. At a step 14, the method 10 includes maintaining a precursor glass 16 in an environment 18 for a first time period of 1.75 hours to 4.25 hours while the environment has a first temperature of 590° C. to 770° C.

In embodiments, the first temperature is 590° C. to 820° C. In embodiments, the first temperature is 590° C. to 810° C., 590° C. to 800° C., 590° C. to 790° C., 590° C. to 780° C., 590° C. to 770° C., 590° C. to 710° C., 690° C. to 710° C., 625° C. to 770° C., or 750° C. to 770° C. In embodiments, the first temperature is 590° C., 600° C., 610° C., 620° C., 630° C., 640° C., 650° C., 660° C., 670° C., 680° C., 690° C., 700° C., 710° C., 720° C., 730° C., 740° C., 750° C., 760° C., 770° C., 780° C., 790° C., 800° C., 810° C., 820° C., or any range within between any two of those temperatures (e.g., 630° C. to 750° C., 690° C. to 720° C., etc.).

In embodiments, the environment 18 increases in temperature to the first temperature before step 14 at a rate of 4° C. to 6° C. per minute (such as about 5° C. per minute, or 5° C. per minute). For example, if the environment 18 is initially at room temperature (e.g., 20° C.), then after 1 minute the environment 18 could be 25° C., then after an additional 1 minute the environment 18 could be 30° C., and so on until the environment 18 is at the first temperature. As another example, if the environment 18 is initially at room temperature (e.g. 20° C.), then after 10 minutes the environment 18 could be 75° C., then after an additional 10 minutes the environment 18 could be 125° C., and so on until the environment 18 is at the first temperature.

In embodiments, the first time period is 1.75 hours to 4.25 hours. In embodiments, the first time period is 1.75 to 2.25 hours, or 3.75 to 4.25 hours. In embodiments, the first time period is 1.75 hours, 2 hours, 2.25 hours, 2.5 hours, 2.75 hours, 3 hours, 3.25 hours, 3.5 hours, 3.75 hours, 4 hours, or 4.25 hours, or any range including any two of those time periods (e.g., 1.75 hour to 3.75 hours, 1.5 hour to 4 hours, etc.).

In embodiments, the precursor glass 16 has a thickness 22. In embodiments, the precursor glass 16 has two primary surfaces 24a, 24b. In those embodiments, the thickness 22 is the shortest straight-line distance between the two primary surfaces 24a, 24b. In embodiments, the thickness 22 of the precursor glass 16 is 0.3 mm to 10.0 cm, such as 0.3 mm to 2.0 cm, 0.3 mm to 1.0 cm, 0.3 mm to 2.0 mm. In embodiments, the thickness 22 is 0.3 mm, 0.4 mm, 0.5 mm, 0.6 mm, 0.7 mm, 0.8 mm, 0.9 mm, 1.0 mm, 1.1 mm, 1.2 mm, 1.3 mm, 1.4 mm, 1.5 mm, 1.6 mm, 1.7 mm, 1.8 mm, 1.9 mm, or 2.0 mm, or any range including any two of those thicknesses (e.g., 0.5 mm to 1.2 mm, 0.6 mm to 1.0 mm, or 0.9 mm to 1.1 mm, etc.).

Then, at a step 20, the method 10 further includes maintaining the precursor glass 16 in the environment 18 for a second time period of 0.75 hour to 4.25 hours while the environment 18 has a second temperature of 850° C. to 925° C. After at least the step 20, the precursor glass 16 has transformed into a glass-ceramic substrate 26. The steps 14 and 20 are sometimes collectively referred to as the act of ceramming the precursor glass 16.

In embodiments, the second temperature is 850° C. to 925° C. In embodiments, the second temperature is 865° C. to 900° C. In embodiments, the second temperature is 850° C., 860° C., 870° C., 880° C., 890° C., 900° C., 910° C., 920° C., 925° C., or any range including any two of those temperatures (e.g., 910° C. to 925° C., 890° C. to 920° C., etc.).

In embodiments, the second time period is 0.75 hour to 4.25 hours. In embodiments, the second time period is 1 hour to 4 hours. In embodiments, the second time period is 0.75 hour, 1 hour, 1.25 hour, 1.50 hour, 1.75 hour, 2 hours, 2.25 hours, 2.5 hours, 2.75 hours, 3 hours, 3.25 hours, 3.5 hours, 3.75 hours, 4 hours, 4.25 hours, or any range including any two of those time periods (e.g., 1.75 hour to 3.75 hours, 1.5 hour to 4 hours, etc.).

When the precursor glass 16 is cerammed into the glass-ceramic substrate 26, portions of the glass crystallize while other portions may remain in a residual glass phase (e.g., amorphous, non-crystalline). As used herein, the term "glass-ceramic" refers to a material comprising at least one crystalline phase and at least one residual glass phase. In particular, the glass-ceramic substrate 26 of this disclosure includes (i) lithium disilicate ($Li_2Si_2O_5$) and (ii) either β-spodumene or β-quartz as the two predominant crystalline phases by weight-percentage of the glass-ceramic substrate 26. The glass-ceramic substrate 26 of this disclosure further includes tetragonal $ZrO_2$ as a crystalline phase. In embodiments, one or more of lithiophosphate, β-quartz (if not one of the two predominant crystalline phases), rutile, and monoclinic $ZrO_2$ are present as minor crystalline phases of the glass-ceramic substrate 26 (i.e., not one of the two predominant crystalline phases). The glass-ceramic substrate 26 may have the same thickness 22 as the precursor glass 16, and in embodiments is 0.3 mm to 10.0 cm, such as 0.3 mm to 2.0 cm, 0.3 mm to 1.0 cm, 0.3 mm to 2.0 mm. In embodiments, the thickness of the glass-ceramic substrate 26 is 0.3 mm, 0.4 mm, 0.5 mm, 0.6 mm, 0.7 mm, 0.8 mm, 0.9 mm, 1.0 mm, 1.1 mm, 1.2 mm, 1.3 mm, 1.4 mm, 1.5 mm, 1.6 mm, 1.7 mm, 1.8 mm, 1.9 mm, 2.0 mm, 3.0 mm, 4.0 mm, 5.0 mm, 6.0 mm, 2.0 mm, 7.0 mm, 8.0 mm, 9.0 mm, 10.0 mm, 2.0 cm, or 10.0 cm, or any range including any two of those thicknesses (e.g., 0.5 mm to 1.2 mm, 0.6 mm to 1.0 mm, or 0.9 mm to 1.1 mm, etc.).

The precursor glass 16, and thus the glass-ceramic substrate 26, providing the basis for the exceptional fracture toughness described below has a composition. The composition comprises (in mole percent of the total composition, on an oxide basis): 55-75 mol % $SiO_2$; 0.2-10 mol % $Al_2O_3$; 0-5 mol % $B_2O_3$; 15-30 mol % $Li_2O$; 0-2 mol % $Na_2O$; 0-2 mol % $K_2O$; 0-5 mol % MgO; 0-2 mol % ZnO; 0.2-3.0 mol % $P_2O_5$; 0.1-10 mol % $ZrO_2$; 0-4 mol % $TiO_2$; and 0-1.0 mol % $SnO_2$. In embodiments, the composition comprises: 68.6-71.5 mol % $SiO_2$; 1.0-4.5 mol % $Al_2O_3$; 21.5-22.2 mol % $Li_2O$; 0.7-1.2 mol % $P_2O_5$; 1.5-5.0 mol % $ZrO_2$; and 0-1.0 mol % $SnO_2$. In embodiments, the composition comprises: 68.6-70.9 mol % $SiO_2$; 1.0-4.3 mol % $Al_2O_3$; 21.5-22.2 mol % $Li_2O$; 0.9-1.2 mol % $P_2O_5$; 2.0-5.0 mol % $ZrO_2$; and 0-1.0 mol % $SnO_2$. In some cases, the composition comprises 3.4 mol % to 4.3 mol % $Al_2O_3$. In some cases, the composition comprises 3.4 mol % to 4.3 mol % $Al_2O_3$. In some cases, the composition comprises 68.6-70.9 mol % $SiO_2$; 1.0-4.3 mol % $Al_2O_3$; 21.5-22.2 mol % $Li_2O$; 0.9-1.2 mol % $P_2O_5$; 3.0-5.0 mol % $ZrO_2$; and 0-1.0 mol % $SnO_2$. In embodiments, the composition comprises: 70.0-70.6 mol % $SiO_2$; 4.85-4.95 mol % $Al_2O_3$; 19.2-19.4 mol % $Li_2O$; 0.195-0.205 mol % $Na_2O$; 0.9-1.1 mol % $P_2O_5$; 1.8-2.6 mol % $ZrO_2$; 1.9-2.1 mol % $TiO_2$; and 0.09-0.11 mol % $SnO_2$. For purposes of this disclosure, composition ranges are inclusive of stated endpoints. For example, 55-75 mol % $SiO_2$ means that the mole percentage of $SiO_2$ in the composition is greater than or equal to 55 mol % and less than or equal to 75 mol %—in other words, 55 mol %≤mol % $SiO_2$≤75 mol %.

In embodiments, the composition is substantially free or free of $B_2O_3$. In embodiments, the composition includes a total amount of $Na_2O+K_2O$ of less than or equal to 0.5 mol %. In embodiments, the composition is substantially free or free of $Na_2O$. In embodiments, the composition is substantially free or free of $K_2O$. In embodiments, the composition is substantially free or free of MgO. In embodiments, the composition is substantially free or free of ZnO. In embodiments, the composition is substantially free or free of $TiO_2$. In some cases, the composition is substantially free or free of all of $B_2O_3$; $K_2O$; MgO; and ZnO. In embodiments, the composition is substantially free or free of all of $B_2O_3$; $Na_2O$; $K_2O$; MgO; ZnO; and $TiO_2$. "Substantially free" means that the component is not actively added, batched, or included into the composition, but may be present in very small amounts as a contaminant (e.g., 500 parts per million (ppm) or less).

$SiO_2$ serves as the primary glass-forming oxide for the precursor glass 16 and can function to stabilize the networking structure of the precursor glass 16 and the glass-ceramic substrate 26. The precursor glass 16 and the glass-ceramic substrate 26 comprise 55-75 mol % $SiO_2$. In embodiments, the composition comprises 68.6-71.5 mol % $SiO_2$, such as 68.6-70.9 mol % $SiO_2$. In embodiments, the composition comprises 70.0-70.6 mol % $SiO_2$. In embodiments, the composition comprises 55, 56, 57, 58, 59, 60, 61, 62, 63, 64, 65, 66, 67, 68, 68.6, 69, 70, 70.9, 71, 72, 73, 74, or 75 mol % $SiO_2$, or any range including any two of those mole percentages (e.g., 57-69 mol % $SiO_2$, 63-73 mol % $SiO_2$, etc.). The content of $SiO_2$ is at least 55 mol % so that lithium disilicate ($Li_2Si_2O_5$) and either β-spodumene or β-quartz are the two predominant crystalline phases when the precursor glass 16 is heat treated to convert to the glass-ceramic substrate 26. The amount of $SiO_2$ is limited to 75 mol % to control melting temperature, because the melting temperature of pure $SiO_2$ or high-$SiO_2$ glasses is undesirably high.

$Al_2O_3$ may also provide stabilization to the network and is an essential constituent in the β-spodumene crystalline phase. $Al_2O_3$ may increase the viscosity of the precursor glass compositions used to form the glass ceramics due to its tetrahedral coordination in a glass melt formed from a glass composition, decreasing the formability of the glass composition when the amount of $Al_2O_3$ is too high. However, when the concentration of $Al_2O_3$ is balanced against the concentration of $SiO_2$ and the concentration of alkali oxides in the glass composition, $Al_2O_3$ can reduce the liquidus temperature of the glass melt, thereby enhancing the liquidus viscosity and improving the compatibility of the glass composition with certain forming processes, such as the fusion forming process. In addition, the presence of $Al_2O_3$ in the composition is favorable to an improvement of mechanical properties and chemical durability of the precursor glass 16 and glass-ceramic substrate 26. However, if the amount of $Al_2O_3$ is too high, then the fraction of lithium disilicate crystals may be decreased, possibly to the extent that an interlocking structure cannot be formed. In embodiments, the composition comprises 0.2-10 mol % $Al_2O_3$. In embodiments, the composition comprises 1.0-4.5 mol % $Al_2O_3$, such as 1.0-4.3 mol % $Al_2O_3$. In embodiments, the composition comprises 3.4-4.3 mol % $Al_2O_3$. In embodiments, the composition comprises 4.85-4.95 mol % $Al_2O_3$. In embodiments, the composition comprises 0.2, 0.5, 1.0, 1.5, 2.0, 2.5, 3.0, 3.4, 3.5, 4, 4.3, 4.5, 4.85, 4.95, 5, 5.5, 6, 6.5, 7, 7.5, 8, 8.5, 9, 9.5, or 10 mol % $Al_2O_3$, or any range including any two of those mole percentages (e.g., 4.5-7.5 mol % $Al_2O_3$, 5-9.5 mol % $Al_2O_3$, etc.).

$B_2O_3$, if included in the composition, can be conducive to lowering the melting temperature of the precursor glass 16. Furthermore, the addition of $B_2O_3$ in the composition helps achieve an interlocking crystal microstructure and improve the damage resistance of the glass-ceramic substrate 26. Moreover, the presence of $B_2O_3$ in the composition lowers the viscosity of the precursor glass 16, which facilitates the growth of lithium disilicate crystals, especially large crystals having a high aspect ratio. However, the amount of $B_2O_3$ in general should be limited to maintain chemical durability and mechanical strength of the glass-ceramic substrate 26. In embodiments, the composition comprises 0-5 mol % $B_2O_3$. In embodiments, the composition comprises 0, 0.5, 1.0, 1.5, 2.0, 2.5, 3.0, 3.5, 4, 4.5, or 5 mol % $B_2O_3$, or any range including any two of those mole percentages (e.g., 0.5-2.5 mol % $B_2O_3$, 2-4.5 mol % $B_2O_3$, etc.).

$Li_2O$ is required in the composition to form both the lithium disilicate crystalline phase and the β-spodumene crystalline phase, if desired. A $LiO_2$ content of 15 mol % in the composition is sufficient to form the lithium disilicate crystalline phase and the β-spodumene crystalline phase, if desired. Without being bound by theory, it is believed that the lithium disilicate crystalline phase is at least partially responsible for the improved fracture toughness values described herein. In addition, the composition including at least 15 mol % $LiO_2$ provides sufficient lithium ions to allow for ion-exchange of the glass-ceramic substrate 26 as further discussed herein. However, when $Li_2O$ content gets too high, over 30 mol %, the precursor glasses become very fluid with low resistivity making it difficult to melt or form. In embodiments, the composition comprises 15-30 mol % $Li_2O$. In embodiments, the composition comprises 21.5-22.2 mol % $Li_2O$. In embodiments, the composition comprises 19.2-19.4 mol % $Li_2O$. In embodiments, the composition comprises 15, 16, 17, 18, 19, 20, 21, 22, 23, 24, 25, 26, 27, 28, 29, or 30 mol % $Li_2O$, or any range including any two of those mole percentages (e.g., 17-28 mol % $Li_2O$, 19-29 mol % $Li_2O$, etc.).

The non-lithium alkali oxides $Na_2O$ and $K_2O$ can be included in the composition to reduce the melting temperature of the precursor glass 16, to shorten the ceramming cycle as well, and to reduce cracks associated with ceramming by lowering the viscosity of the residual glass phase. However, $Na_2O$ and $K_2O$ tend to drive the presence of aluminosilicate residual glass in the glass-ceramic substrate 26, which can lead to deformation during crystallization and undesirable microstructures from a mechanical property perspective. In addition, if too much $Na_2O$ is added to the composition, then the coefficient of thermal expansion of the precursor glass 16 and glass-ceramic substrate 26 may be too high. In embodiments, the composition comprises a total content of $Na_2O+K_2O$ of less than or equal to 0.5 mol %, such as less than or equal to 0.4 mol %, 0.3 mol %, 0.2 mol %, 0.1 mol %, or less. In embodiments, the composition comprises 0-2 mol % $Na_2O$ and 0-2 mol % $K_2O$. In embodiments, the composition comprises 0.195-0.205 mol % $Na_2O$. In embodiments, the composition is substantially free or free of $Na_2O$, $K_2O$, or both. In embodiments, the composition comprises 0, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, or 2.0 mol % $Na_2O$, or any range including any two of those mole percentages (e.g., 0.4-1.3 mol % $Na_2O$, 0.8-1.8 mol % $Na_2O$, etc.). In embodiments, the composition comprises 0, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, or 2.0 mol % $K_2O$, or any range including any two of those mole percentages (e.g., 0.4-1.3 mol % $K_2O$, 0.8-1.8 mol % $K_2O$, etc.).

The composition can include MgO and/or ZnO. MgO and ZnO act as a flux, which lowers the cost of production of the precursor glass 16. The presence of MgO in the composition may increase the elastic modulus, which can be a desirable property. Both MgO and ZnO may enter β-spodumene crystals in partial solid solution. In embodiments, the composition comprises 0-5 mol % MgO. In embodiments, the composition comprises 0, 0.5, 1.0, 1.5, 2.0, 2.5, 3.0, 3.5, 4.0, 4.5, or 5.0 mol % MgO, or any range including any two of those mole percentages (e.g., 0-3.5 mol % MgO, 1.0-4.5 mol % MgO, etc.). In embodiments, the composition is substantially free or free of MgO. In embodiments, the composition comprises 0-2 mol % ZnO. In embodiments, the composition comprises 0, 0.5, 1.0, 1.5, or 2.0 mol % ZnO, or any range including any two of those mole percentages (e.g., 0-1.5 mol % ZnO, 1.0-2.0 mol % ZnO, etc.). In embodiments, the composition is substantially free or free of ZnO.

The composition includes $P_2O_5$. $P_2O_5$ serves as a nucleating agent to produce bulk nucleation. If the concentration of $P_2O_5$ is too low, the precursor glass 16 does not crystallize or undergoes surface crystallization which is unwanted. If the concentration of $P_2O_5$ is too high, devitrification of the precursor glass 16 upon cooling during forming may be difficult to control. The presence of $P_2O_5$ in the glass ceramic substrate 26 may also increase the diffusivity of metal ions in the glass ceramic, which may increase the efficiency of ion exchanging the glass ceramic substrate 26. In embodiments, the composition comprises 0.2-3.0 mol % $P_2O_5$. In embodiments, the composition comprises 0.7-1.2 mol % $P_2O_5$, such as 0.9-1.2 mol % $P_2O_5$. In embodiments, the composition comprises 0.9-1.1 mol % $P_2O_5$. In embodiments, the composition comprises 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, or 3.0 mol % $P_2O_5$, or any range including any two of those mole percentages (e.g., 0.4-1.5 mol % $P_2O_5$, 1.0-2.8 mol % $P_2O_5$, etc.).

The composition includes $ZrO_2$. $ZrO_2$ acts as a network former or intermediate in the precursor glass 16 and is a necessary component for the formation of the tetragonal $ZrO_2$ crystalline phase in the glass-ceramic. In addition, $ZrO_2$ can improve the stability of $Li_2O$—$Al_2O_3$—$SiO_2$—$P_2O_5$ glass by significantly reducing glass devitrification during forming and lowering liquidus temperature. In addition, the presence of crystalline $ZrO_2$ phase in the glass substrate 26 is beneficial for achieving bright white color with high opacity. Further, the addition of $ZrO_2$ is believed to increase the chemical durability of the glass-ceramic substrate 26, and can increase the elastic modulus of the residual glass phase in the glass-ceramic substrate 26, which can be desirable. $ZrO_2$ is the primary component of the tetragonal $ZrO_2$ crystalline phase. In embodiments, the composition includes 0.1-10 mol % $ZrO_2$. In embodiments, the composition includes 1.5-5.0 mol % $ZrO_2$, such as 2.0-5.0 mol % $ZrO_2$. In embodiments, the composition comprises 3.0-5.0 mol % $ZrO_2$. In embodiments, the composition comprises 1.8-2.6 mol % $ZrO_2$. In embodiments, the composition comprises 0.1, 0.5, 1.0, 1.5, 1.8, 2.0, 2.5, 2.6, 3.0, 3.5, 4.0, 4.5, 5.0, 5.5, 6.0, 6.5, 7.0, 7.5, 8.0, 8.5, 9.0, 9.5, or 10.0 mol % $ZrO_2$, or any range including any two of those mole percentages (e.g., 1.5-7.0 mol % $ZrO_2$, 5.5-9.5 mol % $ZrO_2$).

The composition can include $TiO_2$. The composition can include $TiO_2$ to provide the glass-ceramic substrate 26 with a dense white or cream color, and a specific opacity. Where $TiO_2$ is utilized, the resulting glass-ceramic substrate 26 may also include a minor rutile crystalline phase. The presence of $TiO_2$ in the recited amount can make the glass-ceramic substrate 26 more opaque and can make the glass-ceramic substrate 26 exhibit a different white color than if the glass-ceramic substrate 26 did not include $TiO_2$. In addition, $TiO_2$ can improve the fracture toughness of the glass-ceramic substrate 26. Further, $TiO_2$ can act as a nucleating agent for β-spodumene. In embodiments, the composition comprises 0-4 mol % $TiO_2$. In embodiments, the composition comprises 1.9-2.1 mol % $TiO_2$. In embodiments, the composition is substantially free or free of $TiO_2$. In embodiments, the composition comprises 0, 0.5, 1.0, 1.5, 1.9, 2.0, 2.1, 2.5, 3.0, 3.5, or 4.0 mol % $TiO_2$ or any range including any two of those mole percentages (e.g., 0.5-3.0 mol % $TiO_2$, 2.5-3.5 mol % $TiO_2$).

The composition can include CaO. In embodiments, the composition comprises 0-5 mol % CaO, such as 0.5-4.5 mol %, 1.0-4.0 mol %, 1.5-3.5 mol %, 2.0-3.0 mol %, 2.5-5 mol %, or any range including any two of those mole percentages. In embodiments, the composition is substantially free or free of CaO.

The composition can include SrO. In embodiments, the composition comprises 0-5 mol % SrO, such as 0.5-4.5 mol %, 1.0-4.0 mol %, 1.5-3.5 mol %, 2.0-3.0 mol %, 2.5-5 mol %, or any range including any two of those mole percentages. In embodiments, the composition is substantially free or free of SrO.

The composition can include BaO. In embodiments, the composition comprises 0-5 mol % BaO, such as 0.5-4.5 mol %, 1.0-4.0 mol %, 1.5-3.5 mol %, 2.0-3.0 mol %, 2.5-5 mol %, or any range including any two of those mole percentages. In embodiments, the composition is substantially free or free of BaO.

The composition can include $SnO_2$. The composition can include $SnO_2$ either as a result of Joule melting using tin-oxide electrodes, through the batching of tin containing materials, e.g., $SnO_2$, SnO, $SnCO_3$, $SnC_2O_2$, etc., or through addition of $SnO_2$ as an agent to adjust various physical, melting, color, or forming attributes. $SnO_2$ can additionally act as a fining agent. In embodiments, the composition comprises 0-1.0 mol % $SnO_2$. In embodiments, the composition comprises 0.09-0.11 mol % $SnO_2$. In embodiments, the composition is substantially free or free of $SnO_2$. In embodiments, the composition comprises 0, 0.01, 0.02, 0.03, 0.04, 0.05, 0.06, 0.07, 0.08, 0.09 0.10, 0.11, 0.12, 0.13, 0.14, 0.15 0.2, 0.25 0.3, 0.35, 0.4, 0.45, 0.5, 0.55, 0.6, 0.65, 0.7, 0.75, 0.8, 0.85, 0.9, 0.95, or 1.0 mol % $SnO_2$, or any range including any two of those mole percentages (e.g., 0.05-0.55 mol % $SnO_2$, 0.35-0.7 mol % $SnO_2$).

In embodiments, the precursor glass 16 has an internal liquidus temperature of greater than 900° C., such as greater than 1030° C., such as 1050° C. to 1300° C., or 1100° C. to 1290° C. In embodiments, the internal liquidus temperature of the precursor glass 16 is 900° C., 950° C., 1000° C., 1030° C., 1050° C., 1100° C., 1150° C., 1200° C., 1250° C., 1290° C., 1300° C., 1350° C., or 1400° C., or any range including any two of those temperatures (e.g., 950° C. to 1290° C., or 1100° C. to 1350° C. The internal liquidus temperature here is measured by placing crushed particles of the precursor glass 16 in a platinum boat, placing the boat in a furnace having a region of gradient temperatures, heating the boat in an appropriate temperature region for 24 hours, and determining by means of microscopic examination the highest temperature at which crystals appear in the interior of the precursor glass 16.

In embodiments, the precursor glass 16 has a liquidus viscosity of 400 poise to 8000 poise, such as 800 poise to 6000 poise, 580 poise to 5500 poise, 880 poise to 5400 poise, 1100 poise to 5500 poise, 1140 poise to 5400 poise, 1100 poise to 3000 poise, 1140 poise to 2850 poise, 800 poise to 3000 poise, 880 poise to 2850 poise, 800 poise to 1200 poise, or 880 poise to 1140 poise. In embodiments the liquidus viscosity of the precursor glass is 400 poise, 500 poise, 580 poise, 600 poise, 700 poise, 800 poise, 880 poise, 900 poise, 1000 poise, 1100 poise, 1100 poise, 1140 poise, 1200 poise, 1300 poise, 1400 poise, 1500 poise, 1600 poise, 1700 poise, 1800 poise, 1900 poise, 2000 poise, 2100 poise, 2200 poise, 2300 poise, 2400 poise, 2500 poise, 2600 poise, 2700 poise, 2800 poise, 2850 poise, 2900 poise, 3000 poise, 3250 poise, 3500 poise, 3750 poise, 4000 poise, 4250 poise, 4500 poise, 4750 poise, 5000 poise, 5250 poise, 5400 poise, 5500 poise, 6000 poise, 6500 poise, 7000 poise, 7500 poise, or 8000 poise, or any range including any two of those values (e.g., 900 poise to 4250 poise, 1200 poise to 3000 poise, etc.). The liquidus viscosity is the viscosity of the precursor glass 16 at the liquidus temperature. In embodiments, the precursor glass 16 has zircon as the liquidus phase. The liquidus phase is the crystalline phase(s) materializing at the liquidus temperature. In general, a lower internal liquidus temperature and a higher liquidus viscosity are preferred for forming the precursor glass 16.

As mentioned, the glass-ceramic substrate 26 of this disclosure includes (i) lithium disilicate ($Li_2Si_2O_5$) and (ii) either β-spodumene or β-quartz as the two predominant crystalline phases by weight-percentage of the glass-ceramic substrate 26. Lithium disilicate is an orthorhombic crystal based on corrugated sheets of $Si_2O_5$ tetrahedral arrays. The crystals are typically tabular or lath-like in shape, with pronounced cleavage planes. The crystals interlock in random orientations creating microstructures that, without being bound by theory, impart high fracture toughness and high body toughness to the glass-ceramic substrate 26. The randomly-oriented interlocked crystals force cracks to propagate through the material via tortuous paths around these crystals.

β-spodumene, also known as stuffed keatite, possesses a framework structure of corner-connected $SiO_4$ and $AlO_4$ tetrahedra that form interlocking rings. While the β-spodumene formula is often given as $LiAlSi_2O_6$, the crystal can accommodate a wide range of solid solution toward silica, encompassing $Li_2O \cdot Al_2O_3 \cdot nSiO_2$ with n from 4 to 9, or from less than 60 to almost 80 wt % $SiO_2$. β-spodumene crystals possess very low thermal expansion because as temperature increases, their c-axis expands while their a and b axes contract. As a result, glass-ceramics based on β-spodumene are useful technologically in applications requiring good thermal shock resistance. β-quartz also has low thermal expansion and has fine grain size, but has higher translucency. Whether ceramming results in the glass-ceramic 26 having β-spodumene or β-quartz as one of the two predominant crystalline phases may depend on the relative mole percentage of $Al_2O_3$ in the composition, with greater amounts of $Al_2O_3$ resulting in β-spodumene and lesser amounts of $Al_2O_3$ resulting in β-quartz.

Tetragonal $ZrO_2$ imparts white color to the glass-ceramic substrate 26, as well as a high degree of strength and toughness. The tetragonal $ZrO_2$ phase transforms to the monoclinic phase under mechanical stress, which leads to transformational toughening and prevents crack formation and propagation. In embodiments, the crystals of tetragonal $ZrO_2$ have a greatest dimension of 0.1 μm to 10 μm, such as 0.3 μm to 7 μm, 0.5 μm to 4 μm, 0.5 μm to 3 μm, an 0.5 μm to 2.0 μm. In embodiments, the crystals of tetragonal $ZrO_2$ have a greatest dimension of 0.1 μm, 0.2 μm, 0.3 μm, 0.4 μm, 0.5 μm, 1 μm, 1.5 μm, 2 μm, 2.5 μm, 3 μm, 3.5 μm, 4 μm, 4.5 μm, 5 μm, 5.5 μm, 6 μm, 6.5 μm, 7 μm, 7.5 μm, 8 μm, 8.5 μm, 9 μm, 9.5 μm, or 10 μm, or any range including any two of those values (e.g., 0.2 μm to 6.5 μm, or 1 μm to 7.5 μm, etc.).

In embodiments, the glass-ceramic substrate 26 has a fracture toughness of 1.0 to 3.0 $MPa \cdot m^{1/2}$. In embodiments, the glass-ceramic substrate 26 has a fracture toughness of 1.4 to 2.4 $MPa \cdot m^{1/2}$. In embodiments, the glass-ceramic substrate 26 has a fracture toughness greater than or equal to 2.2 $MPa \cdot m^{1/2}$, such as 2.2 $MPa \cdot m^{1/2}$ to 3.0 $MPa \cdot m^{1/2}$, or 2.2 $MPa \cdot m^{1/2}$ to 2.4 $MPa \cdot m^{1/2}$. Fracture toughness is measured by Chevron notch short bar methods (known in the art and described in ASTM procedure E1304-97, which is incorporated herein by reference). The test method involves application of a load to the mouth of a chevron-notched specimen to induce an opening displacement of the specimen mouth. Fracture toughness measured according to this method is relative to a slowly advancing steady-state crack initiated at a chevron notch and propagating in a chevron-shaped ligament. The fracture toughness is determined for the glass-ceramic substrate 26 that has not been ion-exchanged to form a glass-ceramic article 12. Without being bound by theory, glass-ceramic substrates 26 with high fracture toughness can provide resistance to crack penetration and improved drop performance. When such glass-ceramic substrates 26 are chemically strengthened, for example through ion exchange, into the glass-ceramic article 12, the resistance to crack penetration and drop performance can be further enhanced. And the high fracture toughness can also increase the amount of stored tensile energy and maximum central tension that can be imparted to the glass-ceramic through chemical tempering while maintaining desirable fragmentation of the glass-ceramic article 12 upon fracture. Resistance to crack penetration and high drop performance metrics are useful attributes for the glass-ceramic substrate 26 and glass-ceramic article 12 applied to devices, such as smart phones, that are prone to being dropped.

In embodiments, either or both of the glass-ceramic substrate 26 and glass-ceramic article 12 are substantially opaque and have a color that is substantially white. Substantially white and opaque glass-ceramic substrates 26 and glass-ceramic articles 12 provide aesthetic benefits for dental, architectural, kitchen appliance, and consumer electronic applications. For example, it is often aesthetically desirable for the glass-ceramic substrate 26 or glass-ceramic article 12 backing of a smart phone to be substantially opaque and white because it is aesthetically pleasing and obscures the electronic components beneath the backing within the smart phone.

As used herein, the term "substantially white" means that the glass-ceramic substrate 26 or glass-ceramic article 12, as the case may be, has a color presented in CIELAB color space coordinates: $L^*$=85 to 100; $a^*$=−2 to 8; and $b^*$=−70 to 30. In embodiments, the glass-ceramic substrate 26 or glass-ceramic article exhibits a color in CIELAB color space coordinates: $L^*$=88 to 98; $a^*$=−1.0 to 1; and $b^*$=−4.0 to 4.0. In embodiments, the glass-ceramic substrate 26 or glass-ceramic article 12 exhibits a color in CIELAB color space coordinates: $L^*$=93 to 97; $a^*$=−1.0 to 0; and $b^*$=−1.0 to 3.0. In embodiments, the CIELAB color space coordinate $L^*$ of the glass-ceramic substrate 26 or glass-ceramic article 12 is 85, 86, 87, 88, 89, 90, 91, 92, 93, 94, 95, 96, 97, 98, 99, or 100, or any range including any two of those values (e.g, 87 to 96, 92 to 98, etc.). In embodiments, the CIELAB color space coordinate $a^*$ of the glass-ceramic substrate 26 or glass-ceramic article 12 is −2, −1.9, −1.8, −1.7, −1.6, −1.5, −1.4, −1.3, −1.2, −1.1, −1.0, −0.9, −0.8, −0.7, −0.6, −0.5, −0.4, −0.3, −0.2, −0.1, 0, 0.1, 0.2, 0.3, 0.4, 0.5, 0.6, 0.7, 0.8, 0.9, or 1.0, or any range including any two of those values (e.g., −1.9 to 0, 0.2 to 0.8, etc.). In embodiments, the CIELAB color space coordinate $b^*$ of the glass-ceramic substrate 26 or glass-ceramic article 12 is −4, −3.75, −3.5, −3.25, −3.0, −2.75, −2.5, −2.25, −2.0, −1.75, −1.5, −1.25, −1.0, −0.75, −0.5, −0.25, 0, 0.25, 0.5, 0.75, or 1.0, or any range including any two of those values (e.g., −3.5 to 0.5, −1.0 to 0.75, etc.). The CIELAB color space coordinates can be determined by methods known to those in the art using a Color i7 Spectrophotometer (X-Rite Incorporated, Grand Rapids, Mich., USA) using an F02 illuminant under SCI UVC condition.

As used herein, the term "substantially opaque" means that the glass-ceramic substrate 26 or glass-ceramic article 12, as the case may be, has an average opacity of 75 percent to 100 percent throughout the wavelength range of 400 nm to 700 nm for 0.8 mm in thickness 22. In embodiments, the glass-ceramic substrate 26 or glass-ceramic article 12 has an average opacity of 79 percent to 100 percent throughout the wavelength range of 400 nm to 700 nm for 0.8 mm in thickness 22, such as 79 percent to 96 percent. In embodiments, throughout the wavelength range of 400 nm to 700 nm for 0.8 mm in thickness 22, the glass-ceramic substrate 26 or the glass-ceramic article 12 has an average opacity of 75 percent, 76 percent, 77 percent, 78 percent, 79 percent, 80 percent, anyone percent, 81 percent, 82 percent, 83 percent, 84 percent, 85 percent, 86 percent, 87 percent, 88 percent, 89 percent, 90 percent, 91 percent, 92 percent, 93 percent, 94 percent, 95 percent, 96 percent, 97 percent, 98 percent, 99 percent, or 100 percent, or any range including any two of those values (e.g., 83 percent to 91 percent, 88 percent to 99 percent etc.). Average opacity can be determined using the contrast method with the Color i7 Spectrophotometer.

At a step 28, the method 10 further comprises subjecting the glass-ceramic substrate 26 to an ion-exchange treatment in a bath 30, transforming the glass-ceramic substrate 26 into the glass-ceramic article 12. The term "ion exchange" means treating the glass-ceramic substrate 26 with a heated solution containing ions having a different ionic radius than ions that are present within the glass-ceramic substrate 26, thus replacing those ions with smaller ions with the larger ions or vice versa depending on the temperature conditions of the bath 30. For example, lithium ions within the glass-ceramic substrate 26 can be replaced by larger sodium, potassium or silver atoms (among other options) from the bath 30. Alternatively, other alkali metal ions having larger atomic radii, such as (Rb) rubidium or cesium (Cs) could replace smaller alkali metal ions in the glass-ceramic substrate 26.

The glass-ceramic article 12 includes a residual glass phase (that is, glass that did not crystalize during the heat treatment steps 14 and 20). The residual glass phase includes ions of lithium and possibly sodium and potassium (if included in the composition of the precursor glass 16), and those ions are available to be exchanged with ions from the bath 30. This exchange of ions results in regions of compressive stress contiguous with the primary surfaces 24a, 24b, which are balanced by a region of tensile stress.

In addition to imparting strength to the glass-ceramic substrate 26, lithium disilicate provides an additional pathway for the glass-ceramic substrate 26 to undergo ion-exchange. The lithium disilicate crystalline phase can de-crystalize, allowing the now unbound lithium ions to exchange with ions in the bath 30 of the ion-exchange. The result is a relatively high concentration of ions from the bath 30 exchanged into the glass-ceramic article 12 near primary surfaces 24a, 24b of the glass-ceramic article 12. This relatively high concentration of ions provides high surface compression.

β-spodumene, if present as the other predominant crystalline phase, provides yet a further pathway for the glass-ceramic substrate 26 to undergo ion-exchange. β-spodumene possesses a framework structure of corner-connected $SiO_4$ and $AlO_4$ tetrahedra that form interlocking rings. The interlocking rings create channels that house Li ions. Those Li ions can exchange with ions in the bath 30 of the ion-exchange, leading to surface compression and thus strengthening.

In embodiments, the bath 30 comprises molten salt of one or more of ionic Na, K, and Ag. Example salts include nitrates of Na, K, and Ag. In embodiments, the bath 30 includes one or more of molten $NaNO_3$, $KNO_3$, and $AgNO_3$. In embodiments, the bath 30 further comprises a molten salt of ionic Li (for example, $LiNO_3$). In embodiments, the bath 30 may be a molten salt bath including a mixture of $KNO_3$, $NaNO_3$, and $LiNO_3$. In embodiments, other molten salts of ionic Na and K may be used in the bath 30, such as, for example sodium or potassium nitrites, phosphates, or sulfates. In embodiments, the bath 30 includes an additive or additives, such as silicic acid (e.g., 1 wt % or less silicic acid).

In embodiments, the molten bath 30 includes at least 90 wt % $NaNO_3$. In embodiments, the bath 30 includes 90 wt %, 91 wt %, 92 wt %, 93 wt %, 94 wt %, 95 wt %, 96 wt %, 97 wt %, 98 wt %, 99 wt %, 99.9 wt %, or 100 wt % $NaNO_3$, or any range including any two of those values (e.g., 91 wt % to 98 wt % $NaNO_3$, 92 wt % to 99 wt % $NaNO_3$).

The molten baths described herein may include lithium, such as in the form of $LiNO_3$. In embodiments, the bath may include $LiNO_3$ in an amount from 0.01 wt % to 1 wt %, such as 0.1 wt % to 0.9 wt %, 0.2 wt % to 0.8 wt %, 0.3 wt % to 0.7 wt %, 0.4 wt % to 0.6 wt %, 0.1 wt % to 0.5 wt %, and any ranges formed from any of these values.

In embodiments, the step 28 of the ion-exchange treatment comprises a first ion-exchange treatment in which a first bath 30 comprises at least 98 percent by weight of a salt of ionic Na (e.g., $NaNO_3$) and a second ion-exchange treatment in which a second bath 30 comprises a salt of ionic potassium or silver (e.g., $KNO_3$ or $AgNO_3$), or salts of both ionic potassium and silver (e.g., $KNO_3$ and $AgNO_3$). The $KNO_3$ or other salts of ionic K in the second bath 30 impart a spike in compressive stress at the primary surfaces 24a, 24b. In embodiments, the second bath 30 comprises at least 60 wt % $KNO_3$. In embodiments, the second bath 30 comprises 60 wt %, 65 wt %, 70 wt %, 75 wt %, 80 wt %, 85 wt %, 90 wt %, 95 wt %, 98 wt %, 99 wt %, or 100 wt % $KNO_3$, or any range including any two of those values (e.g., 70 wt % to 98 wt % $KNO_3$, 80 wt % to 100 wt % $KNO_3$, etc.). In embodiments, the second bath 30 comprises a eutectic mixture of $KNO_3$ and $NaNO_3$. In embodiments, the second bath 30 comprises, exclusive of additives, 60 wt % $KNO_3$ and 40 wt % $NaNO_3$, 65 wt % $KNO_3$ and 35 wt % $NaNO_3$, 70 wt % $KNO_3$ and 30 wt % $NaNO_3$, 75 wt % $KNO_3$ and 25 wt % $NaNO_3$, 80 wt % $KNO_3$ and 20 wt % $NaNO_3$, 85 wt % $KNO_3$ and 15 wt % $NaNO_3$, 90 wt % $KNO_3$ and 10 wt % $NaNO_3$, 95 wt % $KNO_3$ and 5 wt % $NaNO_3$, or 99 wt % $KNO_3$ and 1 wt % $NaNO_3$, or any range including those pairs of values (e.g., 65 wt % to 80 wt % $KNO_3$ and 35 wt % to 20 wt % $NaNO_3$, 75 wt % to 90 wt % $KNO_3$ and 25 wt % to 10 wt % $NaNO_3$, etc.).

The $AgNO_3$ or other salts of ionic Ag in the second bath 30 impart the glass-ceramic article 12 with antimicrobial properties. In embodiments, the second bath 30 is a molten mixture of $AgNO_3$ and $KNO_3$. In embodiments, the second bath 30 comprises, exclusive of additives, a molten mixture of 5 wt % $AgNO_3$, 10 wt % $AgNO_3$, 20 wt % $AgNO_3$, 30 wt % $AgNO_3$, 40 wt % $AgNO_3$, or 50 wt % $AgNO_3$, with the balance being $KNO_3$, or any range including any two of those weight percentages of $AgNO_3$ with the balance being $KNO_3$. In embodiments, the second bath 30 comprises, exclusive of additives, a molten mixture of 5 wt % $AgNO_3$, 10 wt % $AgNO_3$, 20 wt % $AgNO_3$, 30 wt % $AgNO_3$, 40 wt % AgNO$_3$, or 50 wt % AgNO$_3$, with the balance being NaNO$_3$ and KNO$_3$, or any range including any two of those weight percentages of AgNO$_3$ with the balance being NaNO$_3$ and KNO$_3$.

As a result of this two-step ion-exchange treatment, (i) a first portion of the thickness 22 of the glass-ceramic article 12 comprises a greater mole percentage of K$_2$O or Ag$_2$O than Na$_2$O and (ii) a second portion of the thickness 22 of the glass-ceramic article 12 comprises a greater mole percentage of Na$_2$O than K$_2$O or Ag$_2$O.

In embodiments a mixed bath may be employed in the ion-exchange treatment of the glass-ceramic substrate. The use of a mixed bath may produce a stress profile with potassium enriched surface region and a sodium enriched region extending deeper than the surface region, each region being characterized by compressive stress. In embodiments the ion exchange bath may include a mixture of NaNO$_3$, KNO$_3$, and LiNO$_3$. The mixed bath may include NaNO$_3$ in any appropriate amount, such as in the range of 10 wt % to 98 wt %, 20 wt % to 90 wt %, 30 wt % to 80 wt %, 40 wt % to 70 wt %, 50 wt % to 60 wt %, and any ranges formed from any of these pairs of values. The mixed bath may include KNO$_3$ in any appropriate amount, such as in the range of 10 wt % to 98 wt %, 20 wt % to 90 wt %, 30 wt % to 80 wt %, 40 wt % to 70 wt %, 50 wt % to 60 wt %, and any ranges formed from any of these pairs of values. The mixed bath may include LiNO$_3$ in an amount from 0.01 wt % to 1 wt %, such as 0.1 wt % to 0.9 wt %, 0.2 wt % to 0.8 wt %, 0.3 wt % to 0.7 wt %, 0.4 wt % to 0.6 wt %, 0.1 wt % to 0.5 wt %, and any ranges formed from any of these values. In embodiments, the mixed bath includes 40 wt % NaNO$_3$, 60 wt % KNO$_3$, and 0.1 wt % LiNO$_3$.

In embodiments, the bath 30 has a temperature of 380° C. to 500° C. In embodiments, the bath 30 has a temperature of 380° C., 390° C., 400° C., 410° C., 420° C., 430° C., 440° C., 450° C., 460° C., 470° C., 480° C., 490° C., or 500° C., or any range including any two of those temperatures (e.g., 410° C.-470° C., 420° C.-500° C., etc.).

In embodiments, the glass-ceramic substrate 26 contacts the bath 30 for a time period of 3 hours to 48 hours. In embodiments, the time period is 3 hours, 4 hours, 5 hours, 6 hours, 7 hours, 8 hours, 9 hours, 10 hours, 11 hours, 12 hours, 13 hours, 14 hours, 15 hours, 16 hours, 17 hours, 18 hours, 19 hours, 20 hours, 21 hours, 22 hours, 23 hours, 24 hours, 25 hours, 26 hours, 27 hours, 28 hours, 29 hours, 30 hours, 31 hours, 32 hours, 33 hours, 34 hours, 35 hours, 36 hours, 37 hours, 38 hours, 39 hours, 40 hours, 41 hours, 42 hours, 43 hours, 44 hours, 45 hours, 46 hours, 47 hours, or 48 hours, or any range including any two of those time periods (e.g. 4 hours to 27 hours, 10 hours to 25 hours, etc.).

The ion-exchange treatment can occur by dipping the glass-ceramic substrate 26 into the bath 30, spraying the bath 30 onto the glass-ceramic substrate 26, or otherwise physically contacting the glass-ceramic substrate 26 with the bath 30.

After the ion-exchange treatment, it should be understood that the composition of the glass-ceramic article 12 at the primary surfaces 24a, 24b may be different than the composition of glass-ceramic substrate 26 before the ion-exchange treatment. This results from the migration of different ions between the glass-ceramic substrate 26 and the bath 30. However, the composition of the glass-ceramic article 12 at a center-volume 32 of the glass-ceramic article 12 will, in embodiments, be the least influenced by the ion-exchange treatment and may have a composition substantially the same as or the same as the glass-ceramic substrate 26. The center-volume 32 of the glass-ceramic article 12 encompasses a point 34 halfway through the thickness 22 between the primary surfaces 24a, 24b, and at least 0.5 mm away from any lateral edge.

In embodiments, the ion-exchange treatment step 28 does not significantly alter the composition of the glass-ceramic article 12 at the center-volume 32 of the glass-ceramic article 12. In other words, the composition of the glass-ceramic article 12 at the center-volume 32 is generally the same as the composition of the glass-ceramic substrate 26 before the glass-ceramic substrate 26 undergoes ion-exchange treatment, which itself is the same as the precursor glass 16. The composition of the center-volume 32 of an ion-exchanged glass-ceramic article 12 can be determined by microprobe by performing a line scan from primary surface 24a to primary surface 24b and determining the composition at the center. The crystalline phase assemblage at the center-volume 32 can be determined from Xray diffraction using Rietveld analysis, unless otherwise specified. The glass-ceramic article 12 may adopt the thickness 22 of the precursor glass 16, and in embodiments is 0.3 mm to 1.0 cm, such as 0.3 mm to 2.0 mm. In embodiments, the thickness of the glass-ceramic article 12 is 0.3 mm, 0.4 mm, 0.5 mm, 0.6 mm, 0.7 mm, 0.8 mm, 0.9 mm, 1.0 mm, 1.1 mm, 1.2 mm, 1.3 mm, 1.4 mm, 1.5 mm, 1.6 mm, 1.7 mm, 1.8 mm, 1.9 mm, or 2.0 mm, or any range including any two of those thicknesses (e.g., 0.5 mm to 1.2 mm, 0.6 mm to 1.0 mm, or 0.9 mm to 1.1 mm, etc.).

In embodiments, as a result of the ion-exchange treatment step 28, sodium ions are present through the entirety of the thickness 22 of the glass-ceramic article 12, even when the composition of the precursor glass 16 was substantially free of Na$_2$O. The mole percentage of Na$_2$O in the glass-ceramic article 12 decreases from the primary surfaces 24a, 24b towards the center-volume 32. This feature can be achieved with the glass-ceramic substrates 26 described herein by utilizing a precursor glass 16 having thickness 22 of, for example, 0.3 mm to 2.0 mm. In addition, this feature can be achieved through adjusting one or both of the temperature of the bath 30 and the time-period that the glass-ceramic substrate 26 is contacting the bath 30. In general, the higher the temperature of the bath 30, the shorter the period of time can be to achieve this feature. In general, the longer the period of time that the glass-ceramic substrate 26 is in the bath 30, the lower the temperature of the bath 30 can be to achieve this feature.

In embodiments, as a result of the ion-exchange treatment step 28, the composition of a portion of the glass-ceramic article 12 from one or both of the primary surfaces 24a, 24b into the thickness 22 comprises over 10 mol % Na$_2$O (on an oxide basis). The mole percentage of Na$_2$O decreases from the primary surfaces 24a, 24b toward the center-volume 32. This feature can be achieved with the glass-ceramic substrates 26 described herein when the bath 30 includes approximately 100 percent molten NaNO$_3$ and is substantially free of lithium. The elevated mole percentage of Na$_2$O near the primary surfaces 24a, 24b can be part of a spike in Na$_2$O concentration resulting from the above-described amorphization of the lithium disilicate crystalline phase near the primary surfaces 24a, 24b.

In embodiments, the molten salt bath 30 of the ion-exchange treatment comprises greater than 98 percent by weight NaNO$_3$ and 0.01 to 1 percent by weight LiNO$_3$. In these embodiments, the bath 30 has a temperature of 450° C. to 500° C., such as 450° C., 460° C., 470° C., 480° C., 490° C., or 500° C., or any range between any two of those temperatures. In these embodiments, the bath 30 contacts the glass-ceramic substrate 26 for a time period of 4 hours to 8 hours, such as 4 hours, 5 hours, 6 hour, 7 hours, or 8 hours, or any range including any two of those time periods. In these embodiments, as a result of the ion-exchange treatment step 28, 7 mole percent Na$_2$O is the maximum concentration of Na$_2$O at any depth into the thickness 22 of the glass-ceramic article 12, and sodium ions are present within the glass-ceramic article 12 to a depth of at least 15 percent of the thickness 22 from the primary surfaces 24a, 24b. In addition, the concentration of Na$_2$O within the glass-ceramic article 12 decreases as a function of depth into the thickness 22 of the glass-ceramic article 12 from the primary surfaces 24a, 24b. In embodiments, the composition of the precursor glass 16 was substantially free of Na$_2$O. In embodiments, the 7 mole percent Na$_2$O is the maximum concentration of Na$_2$O at any depth into the thickness 22 of the glass-ceramic article 12, and sodium ions are present within the glass-ceramic article 12 to a depth of at least 25 percent of the thickness 22 from the primary surfaces 24a, 24b In embodiments, the glass-ceramic article 12 exhibits a ring-on-ring load-to-failure of at least 120 kgf, such as 110 kgf to 130 kgf. The ring-on-ring load-to-failure test is a flexural strength measurement known in the art for testing flat glass and glass ceramic specimens and is described in ASTM C1499-09(2013), entitled "Standard Test Method for Monotonic Equibiaxial Flexural Strength of Advanced Ceramics at Ambient Temperature," which is incorporated herein by reference. The higher the ring-on-ring load-to-failure value, the greater the glass-ceramic article 12 resists fracture. The greater the glass-ceramic article 12 is to resisting fracture, the greater the durability of the application to which the glass-ceramic article 12 is applied.

In embodiments, after being abraded with SiC particles (90 grit) at an abrasion pressure of 45 psi, the glass-ceramic article 12 exhibits a ring-on-ring load-to-failure of at least 80 kgf, such as 80 to 100 kgf or 80 to 90 kgf. The SiC particles are delivered to the glass sample using the method and apparatus described in Annex A2, entitled "Abrasion Procedures," of ASTM C158-02(2012), entitled "Standard Test Methods for Strength of Glass by Flexure (Determination of Modulus of Rupture)," which is incorporated herein by reference. The higher the ring-on-ring load-to-failure value after abrasion, the greater the glass-ceramic article 12 resists fracture after being abraded. In many applications, the glass-ceramic article 12 is prone to being abraded over time. For example, the glass-ceramic article 12 applied to an electronic device such as a smart phone can accumulate many small defects over time (such as from keys or coins abrading the glass-ceramic article 12). The higher the ring-on-ring load-to-failure after abrasion, the more resistance to fracture the glass-ceramic article 12 retains despite being abraded in such a manner.

EXAMPLES

Examples 1-14. A precursor glass was formed from each of the compositions detailed in Table 1 below designated as Examples 1-14. The internal liquidus temperature for the precursor glasses of Examples 1-11 was measured and reported below. The internal liquidus temperature generally increases as ZrO$_2$ content in the composition of the precursor glass increases.

The liquidus viscosity was measured and reported below for the precursor glasses of Examples 1-4. The liquidus viscosity generally decreases as ZrO$_2$ content in the composition of the precursor glass increases.

The liquidus phase was determined and reported below for the precursor glasses of Examples 1-9. Lithiophosphate and β-spodumene materialized as the liquidus phases for the precursor glass of Example 1, which included 2.0 mol % ZrO$_2$ in the composition. However, when the composition included 3.0 mol % or more ZrO$_2$, as for the precursor glasses of Examples 2-9, zircon materialized as the liquidus phase.

Pursuant to the method above, the precursor glasses of Examples 1-14 were maintained in an environment having a first temperature of 700° C. for a first time period of 2 hours (for Examples 1-11) or 4 hours (for Examples 12-14). Then, the precursor glasses were maintained in the environment having a second temperature for a second time period, as set forth below as the "Ceramming Cycle." More specifically, the precursor glasses of Examples 1 and 2 were maintained in the environment having the second temperature of 875° C. for the second time period of 4 hours. The precursor glasses of Examples 3-11 were maintained in the environment having the second temperature of 900° C. for the second time period of 4 hours. The precursor glasses of Examples 12-14 were maintained in the environment having the second temperature of 875° C. for the second time period of 1 hour. The precursor glasses thus became glass-ceramic substrates.

The phase assemblages for the glass-ceramic substrates of Examples 1-14 were determined and are set forth in Table 1 below. X-ray diffraction was utilized to determine the phase assemblage using Rietveld analysis. X-ray diffraction analysis techniques are known to those in the art, using such commercially available equipment as the model PW1830 (Cu Kα radiation) diffractometer manufactured by Philips, Netherlands. Lithium disilicate ("LS2" in Table 1 below) was one of the two predominant crystalline phases for the glass-ceramic substrates of all of Examples 1-14. β-spodumene was the other of the two predominant crystalline phases for the glass-ceramic substrates of Examples 1-6 (in which the precursor glass composition was substantially free of TiO$_2$ and included 3.4 mol % to 4.3 mol % Al$_2$O$_3$) and Examples 12-14 (in which the precursor glass composition included 4.9 mol % Al$_2$O$_3$ and 2.0 mol % TiO$_2$). β-quartz was the other of the two predominant crystalline phases (instead of β-spodumene) for the glass-ceramic substrates of Examples 7-11, where the precursor glass composition included 1.0 to 2.9 mol % Al$_2$O$_3$. The glass-ceramic substrates of all of Examples 1-14 included tetragonal ZrO$_2$ ("t-ZrO$_2$") and lithiophosphate ("L3P") as crystalline phases. Monoclinic ZrO$_2$ ("m-ZrO$_2$") was present as a crystalline phase of the glass-ceramic substrates of Examples 1-11. Rutile was present as a crystalline phase of the glass-ceramic substrates of Example 12, where the mole percentage of TiO$_2$ exceeded the mole percentage of ZrO$_2$ in the composition of the precursor glass.

The general color appearance was recorded as "white" for the glass-ceramic substrates of all of Examples 1-14. In all of Examples 1-14, the composition of the precursor glass included 1.8 mol % to 5.0 mol % ZrO$_2$.

The fracture toughnesses ("$K_{1c}$") of the glass-ceramic substrates of Examples 1 and 2 were measured and recorded. The glass-ceramic substrate of Example 1, made from a precursor glass composition comprising 2.0 mol % ZrO$_2$, had a fracture toughness of 1.6 MPa·m$^{1/2}$. The glass-ceramic substrate of Example 2, made from a precursor glass composition comprising 3.0 mol % ZrO$_2$, had a fracture toughness of 2.2 MPa·m$^{1/2}$.

The Poisson's ratio, shear modulus, and Young's modulus for the glass-ceramic substrates of Examples 1, 2, and 4 were determined and recorded as set forth in Table 1. These properties were determined pursuant to the methods described in ASTM C1259 "Standard Test Method for Dynamic Young's Modulus, Shear Modulus, and Poisson's Ratio for Advanced Ceramics by Impulse Excitation of Vibration," ASTM International, Conshohocken, Pa., US, which is incorporated herein by reference.

The Vickers hardness test value ("HV") for the glass-ceramic substrate of Example 1 was determined and recorded as set forth below in Table 1. This property was determined pursuant to the methods described in ASTM C1327 (and its progeny, all herein incorporated by reference) entitled "Standard Test Methods for Vickers Indentation Hardness of Advanced Ceramics," ASTM International, Conshohocken, Pa., US. The contents of ASTM C1327, ASTM C1259, ASTM E1304-97, ASTM C1499-09(2013), and ASTM C158-02(2012), Annex 2, are incorporated herein by reference in their entirety.

and second temperature (a second time period of 4 hours was maintained as a constant). The ceramming cycles implemented pursuant to the method are set forth in Table 2 below. The samples are designated as Examples 1 and 1A-1D.

CIELAB color space coordinates ("Color coordinates") (e.g., L*, a*, and b*) for describing the color exhibited by the glass-ceramic substrates of Examples 1 and 1A-1D were determined using 0.8 mm in thickness samples with the Color i7 Spectrophotometer using an F02 illuminant under SCI UVC condition. The CIELAB color space coordinates for Examples 1 and 1A-1D are set forth in Table 2 below.

The average opacity ("Opacity %") throughout the wavelength range of 400 nm to 700 nm of the glass-ceramic substrates of Examples 1 and 1A-1D were determined using the contrast method with the Color i7 Spectrophotometer. The average opacity for Examples 1 and 1A-1D are set forth

TABLE 1

| Oxide (mol %) | Example 1 | 2 | 3 | 4 | 5 | 6 | 7 |
|---|---|---|---|---|---|---|---|
| $SiO_2$ | 70.7 | 70.0 | 69.7 | 69.3 | 68.6 | 68.9 | 69.3 |
| $Al_2O_3$ | 4.3 | 4.3 | 4.2 | 4.2 | 4.2 | 3.4 | 2.9 |
| $Li_2O$ | 22.1 | 21.9 | 21.8 | 21.7 | 21.5 | 21.5 | 21.6 |
| $Na_2O$ | 0.0 | 0.0 | 0.0 | 0.0 | 0.0 | 0.0 | 0.0 |
| $P_2O_5$ | 0.9 | 0.9 | 0.9 | 0.9 | 0.9 | 1.2 | 1.2 |
| $ZrO_2$ | 2.0 | 3.0 | 3.4 | 3.9 | 4.9 | 4.9 | 4.9 |
| $TiO_2$ | 0.0 | 0.0 | 0.0 | 0.0 | 0.0 | 0.0 | 0.0 |
| $SiO_2$ | 0.0 | 0.0 | 0.0 | 0.0 | 0.0 | 0.1 | 0.1 |
| Internal liquidus (° C.) | 1030 | 1100 | 1160 | 1200 | 1275 | 1290 | 1255 |
| Liquidus viscosity (poise) | 5400 | 2850 | 1140 | 880 | — | | |
| Liquidus phase | L3P/spd | zircon | Zircon | Zircon | Zircon | Zircon | Zircon |
| Ceramming cycle | 700° C.-2 h 875° C.-4 h | 700° C.-2 h 875° C.-4 h | 700° C.-2 h 900° C.-4 h | 700° C.-2 h 900° C.-4 h | 700° C.-2 h 900° C.-4 h | 700° C.-2 h 900° C.-4 h | 700° C.-2 h 900° C.-4 h |
| Phase assemblage | β-spodumene, LS2, t-$ZrO_2$, m-$ZrO_2$, L3P | β-spodumene, LS2, t-$ZrO_2$, m-$ZrO_2$, L3P | β-spodumene, LS2, t-$ZrO_2$, m-$ZrO_2$, L3P | β-spodumene, LS2, t-$ZrO_2$, m-$ZrO_2$, L3P | β-spodumene, LS2, t-$ZrO_2$, m-$ZrO_2$, L3P | β-spodumene, LS2, t-$ZrO_2$, β-quartz, m-$ZrO_2$, L3P | β-quartz, LS2, t-$ZrO_2$, m-$ZrO_2$, L3P; |
| Appearance | White | White | White | White | White | White | White |
| $K_{1c}$ (MPa · m$^{1/2}$) | 1.6 | 2.2 | | | | | |
| Poisson's ratio | 0.24 | 0.24 | | 0.24 | | | |
| Shear modulus (GPa) | 38.7 | 39.0 | | 39.2 | | | |
| Young's modulus (GPa) | 95.6 | 96.7 | | 97.4 | | | |
| HV (kgf/mm$^2$) | 750 | | | | | | |

| Oxides (mol %) | Example 8 | 9 | 10 | 11 | 12 | 13 | 14 |
|---|---|---|---|---|---|---|---|
| $SiO_2$ | 69.6 | 69.9 | 70.9 | 70.6 | 70.6 | 70.3 | 70.0 |
| $Al_2O_3$ | 2.5 | 2.0 | 1.0 | 1.5 | 4.9 | 4.9 | 4.9 |
| $Li_2O$ | 21.8 | 21.9 | 22.2 | 22.1 | 19.4 | 19.3 | 19.2 |
| $Na_2O$ | 0.0 | 0.0 | 0.0 | 0.0 | 0.2 | 0.2 | 0.2 |
| $P_2O_5$ | 1.2 | 1.2 | 0.9 | 0.9 | 1.0 | 1.0 | 1.0 |
| $ZrO_2$ | 4.9 | 4.9 | 5.0 | 5.0 | 1.8 | 2.2 | 2.6 |
| $TiO_2$ | 0.0 | 0.0 | 0.0 | 0.0 | 2.0 | 2.0 | 2.0 |
| $SnO_2$ | 0.1 | 0.1 | 0.0 | 0.0 | 0.1 | 0.1 | 0.1 |
| Internal Liquidus (° C.) | 1245 | 1225 | 1180 | 1185 | | | |
| Liquidus phase | Zircon | Zircon | | | | | |
| Ceramming cycle | 700° C.-2 h 900° C.-4 h | 700° C.-2 h 900° C.-4 h | 700° C.-2 h 900° C.-4 h | 700° C.-2 h 900° C.-4 h | 700° C.-4 h 875° C.-1 h | 700° C.-4 h 875° C.-1 h | 700° C.-4 h 875° C.-1 h |
| Phase assemblage | β-quartz, LS2, t-$ZrO_2$, m-$ZrO_2$, L3P | β-quartz, LS2, t-$ZrO_2$, m-$ZrO_2$, L3P | β-quartz, LS2, t-$ZrO_2$, m-$ZrO_2$, L3P | β-quartz, LS2, t-$ZrO_2$, m-$ZrO_2$, L3P | β-spodumene, LS2, t-$ZrO_2$, β-quartz, L3P, rutile | β-spodumene, LS2, t-$ZrO_2$, β-quartz, L3P | β-spodumene, LS2, t-$ZrO_2$, β-quartz, L3P |
| Appearance | White | White | White | White | White | White | White |

Examples 1 (continued) and 1A-1D. Samples of the precursor glass of Example 1 were, pursuant the method above, again subjected to ceramming cycles, this time including variations in first temperature, first time period, in Table 2 below. The glass-ceramic substrate of Example 1D, cerammed using the highest first temperature of 750° C. at a first time period of 4 hours, resulted in the greatest opacity (95%) of this set of examples with 2.0 mol % $ZrO_2$ and no $TiO_2$, while still having substantially white CIELAB color coordinates. The glass-ceramic substrates of Examples 1A and 1B exhibited CIELAB color coordinates closest to pure white, while being substantially opaque at 80 percent and 85 percent average opacity, respectively.

TABLE 2

| Example | 1A | 1B | 1 | 1C | 1D |
|---|---|---|---|---|---|
| Ceramming cycle | 600° C.- 2 h 875° C.- 4 h | 625° C.- 2 h 875° C.- 4 h | 700° C.- 2 h 875° C.- 4 h | 650° C.- 4 h 865° C.- 4 h | 750° C.- 4 h 865° C.- 4 h |
| Color co-ordinates | $L^* = 96.0$ $a^* = -0.3$ $b^* = 0.3$ | $L^* = 96.0$ $a^* = -0.3$ $b^* = 0.3$ | $L^* = 96.5$ $a^* = -0.4$ $b^* = 2.6$ | $L^* = 93.7$ $a^* = -0.8$ $b^* = -0.1$ | $L^* = 95.3$ $a^* = -0.5$ $b^* = -0.5$ |
| Opacity (%) | 80 | 85 | 90 | 78.5 | 95 |

Example 1E. Pursuant to the method of this disclosure, another sample of the precursor glass of Example 1 having a thickness of 0.8 mm from Table 1 above was cerammed using a first temperature of 760° C. for a first time period of 4 hours, and a second time period of 875° C. for a second time period of 4 hours. This sample is designated as Example 1E. The environment in which the precursor glass was maintained was heated to the first temperature of 760° C. at a rate of 5° C. per minute.

Figure 4:
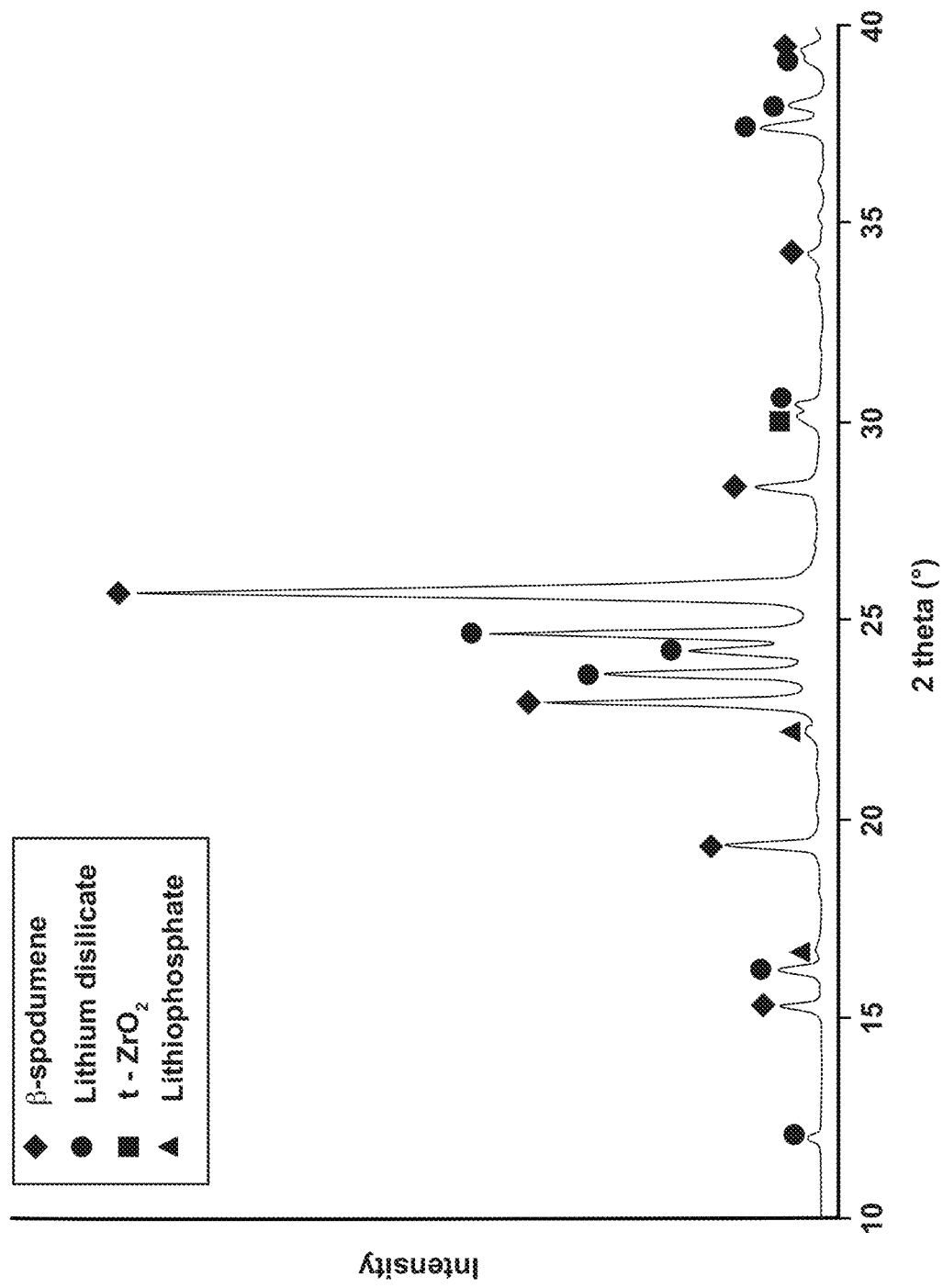
FIG. 4 is a plot of the reflected x-ray diffraction intensities ("Intensity") as a function of the detector angle ("2 theta (°)") for an example glass-ceramic substrate (Example 1E) manufactured pursuant to the method of FIG. 1, illustrating lithium disilicate and β-spodumene as the two predominant crystalline phases (by weight percentage) of the glass-ceramic substrate, and also tetragonal $ZrO_2$ ("t-$ZrO_2$") and lithiophosphate as crystalline phases.

The phase assemblage of the resulting glass-ceramic substrate was determined via X-ray diffraction using Rietveld analysis. The plot of the reflected intensities ("Intensity") as a function of the detector angle ("2 theta (°)") is reproduced as FIG. 4. The plot reveals β-spodumene and lithium disilicate as the two predominant crystalline phases (by weight percentage) of the glass-ceramic substrate. The plot additionally reveals tetragonal $ZrO_2$ ("t-$ZrO_2$") and lithiophosphate as crystalline phases.

Figure 5A:
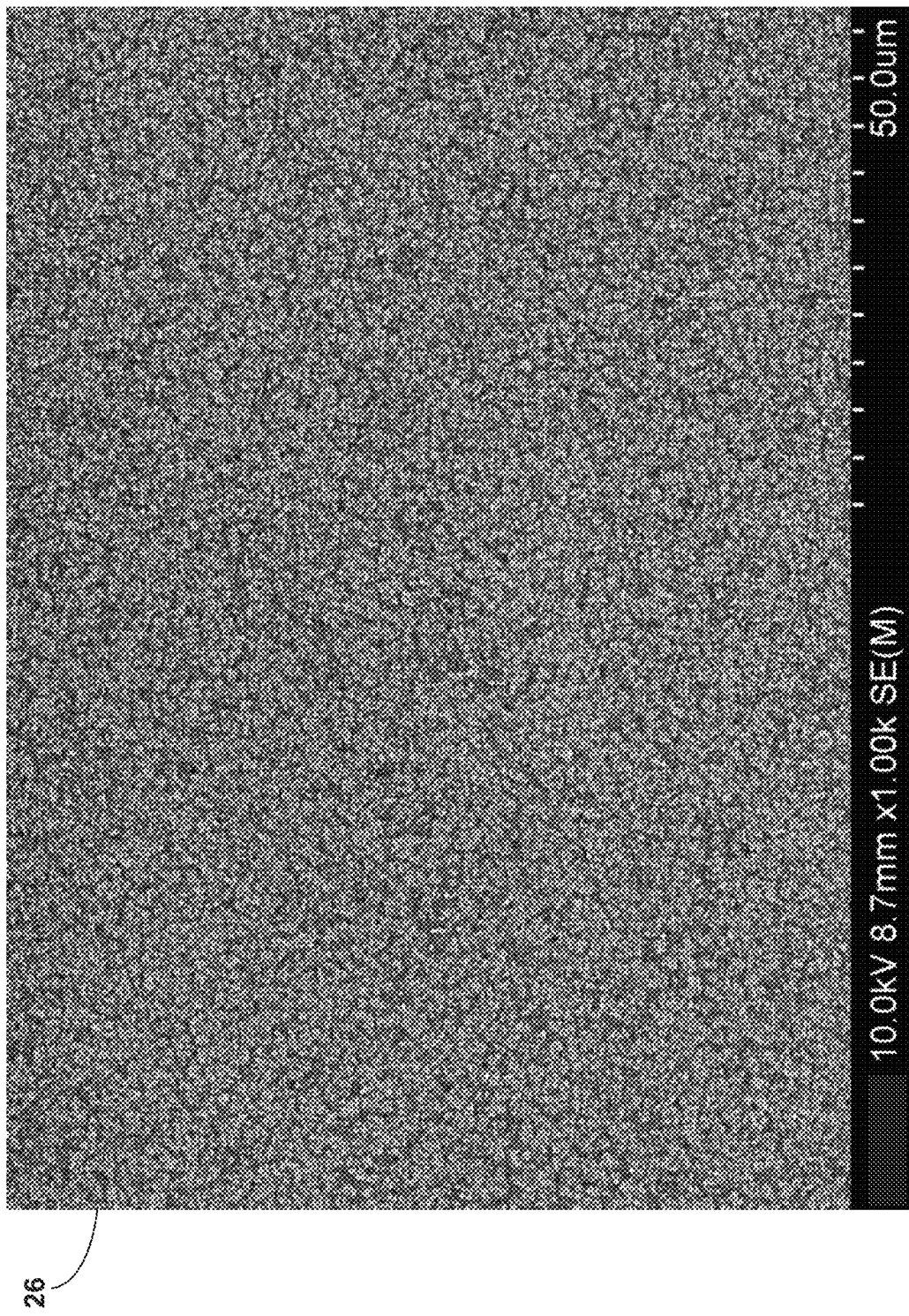
FIG. 5A is a scanning electron microscope image of the glass-ceramic substrate of FIG. 4 (Example 1E)
Figure 5B:
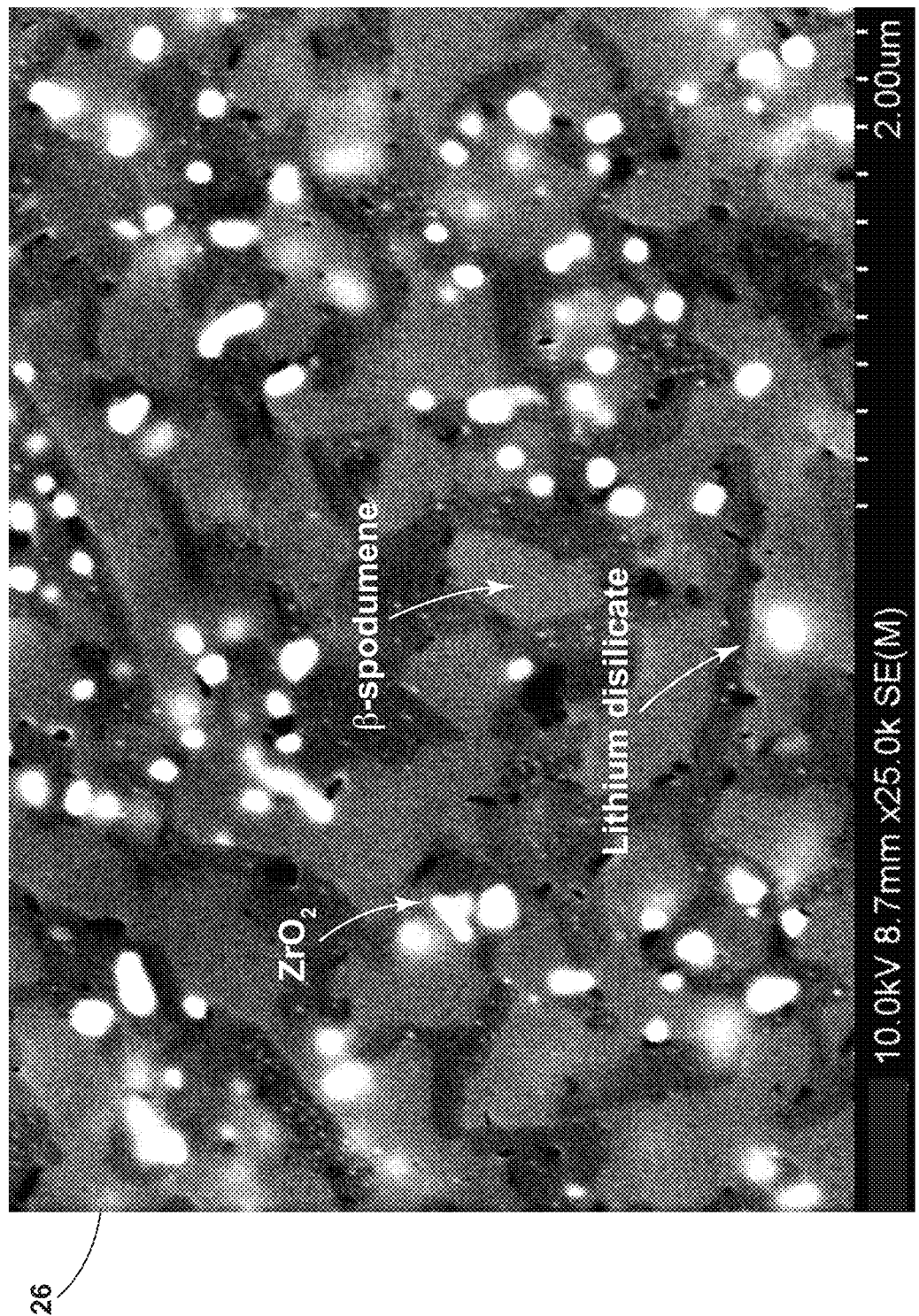
FIG. 5B is another scanning electron microscope image of the glass-ceramic substrate of FIG. 4 (Example 1E), illustrating white spots corresponding to the tetragonal $ZrO_2$ crystalline phase, needles corresponding to the lithium disilicate crystalline phase, and grey blocks corresponding to the β-spodumene crystalline phase.

A scanning electron microscope was utilized to image the glass-ceramic substrate of Example 1E. Several images are reproduced herein as FIGS. 5A and 5B. In the images, the white spots correspond to the tetragonal $ZrO_2$ crystalline phase, the needles correspond to the lithium disilicate crystalline phase, and the grey blocks correspond to the β-spodumene crystalline phase.

Pursuant to the method above, three samples of the glass-ceramic substrate of Example 1E were subjected to an ion-exchange treatment in a bath of 100 percent $NaNO_3$ at a temperature of 470° C., each with a different period of time in the bath. A first sample was in the bath for 4 hours. A second sample was in the bath for 7 hours. A third sample was in the bath for 16 hours. The ion-exchange treatment transformed the glass-ceramic substrates into glass-ceramic articles, each with a different profile of concentration of sodium ions as a function of depth into the glass-ceramic article (and thus each with a different compressive stress profile).

Figure 6:
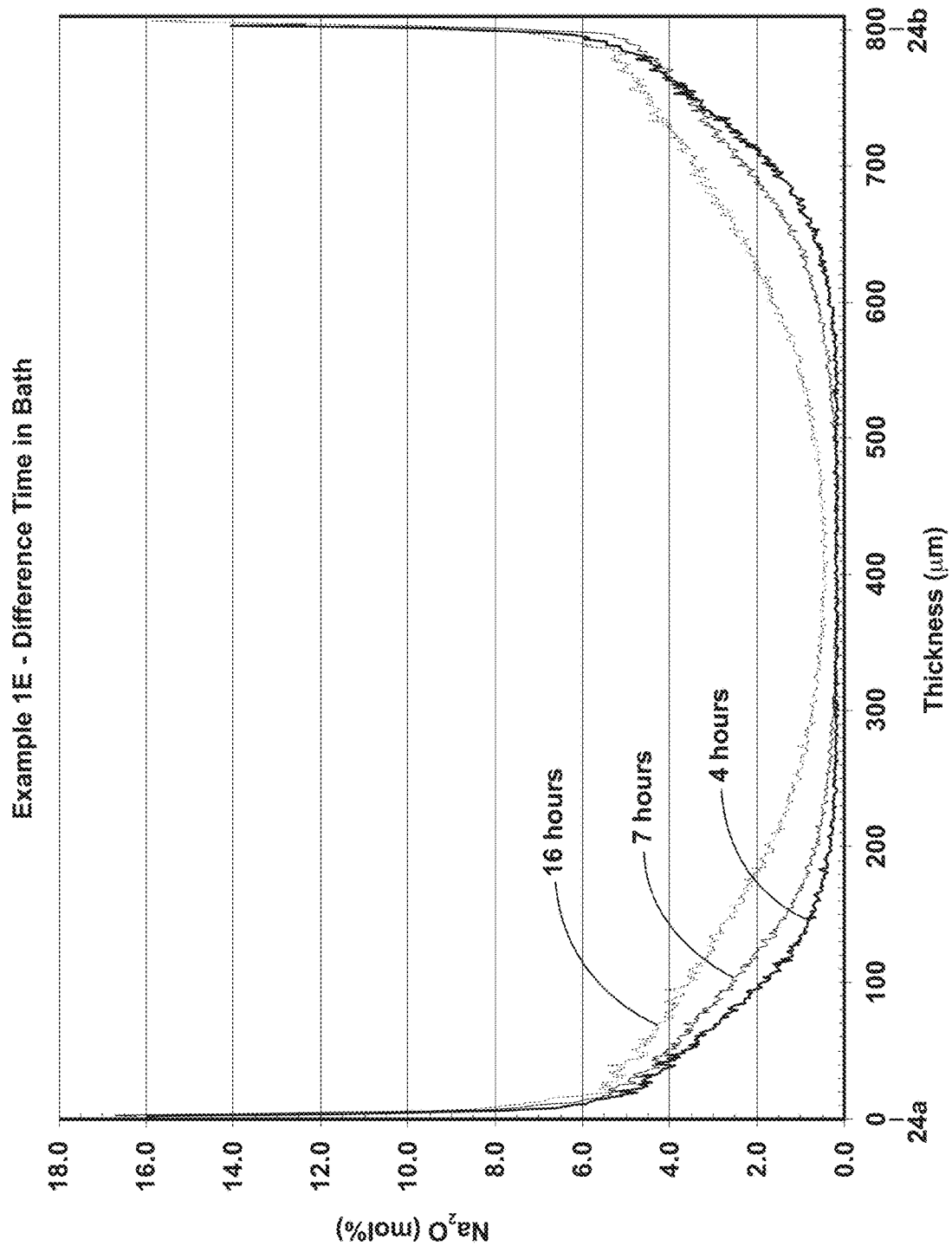
FIG. 6 is a graph characterizing $Na_2O$ as a function of depth into the thickness for three glass-ceramic articles formed from the glass-ceramic substrate of Example 1E, each sample using a different ion-exchange treatment period of time.

An electron microprobe was utilized to characterize composition (particularly $Na_2O$, demonstrative of sodium ions) of the glass-ceramic articles of Example 1E as a function of depth into the thickness of the glass-ceramic articles. A graph of the results is reproduced as FIG. 6. For the sample that was in the bath for 16 hours, sodium ions extend through the entire thickness of the glass-ceramic article, although the precursor glass was substantially free of $Na_2O$. For each of the samples, the composition of portions of the glass-ceramic article from the primary surfaces into the thickness comprises over 10 percent $Na_2O$. These portions are from the primary surfaces into approximately 10 μm into the thickness. Near the primary surfaces, the rate of change of mole percentage of $Na_2O$ as a function of position (depth) (i.e., the slope of the mole percentage of $Na_2O$) within the thickness is higher than the rate of change (i.e., the slope) further within the thickness of the glass-ceramic article. The higher rate of change (i.e., steeper slope) is illustrated as spikes in concentration in FIG. 6.

Figure 7:
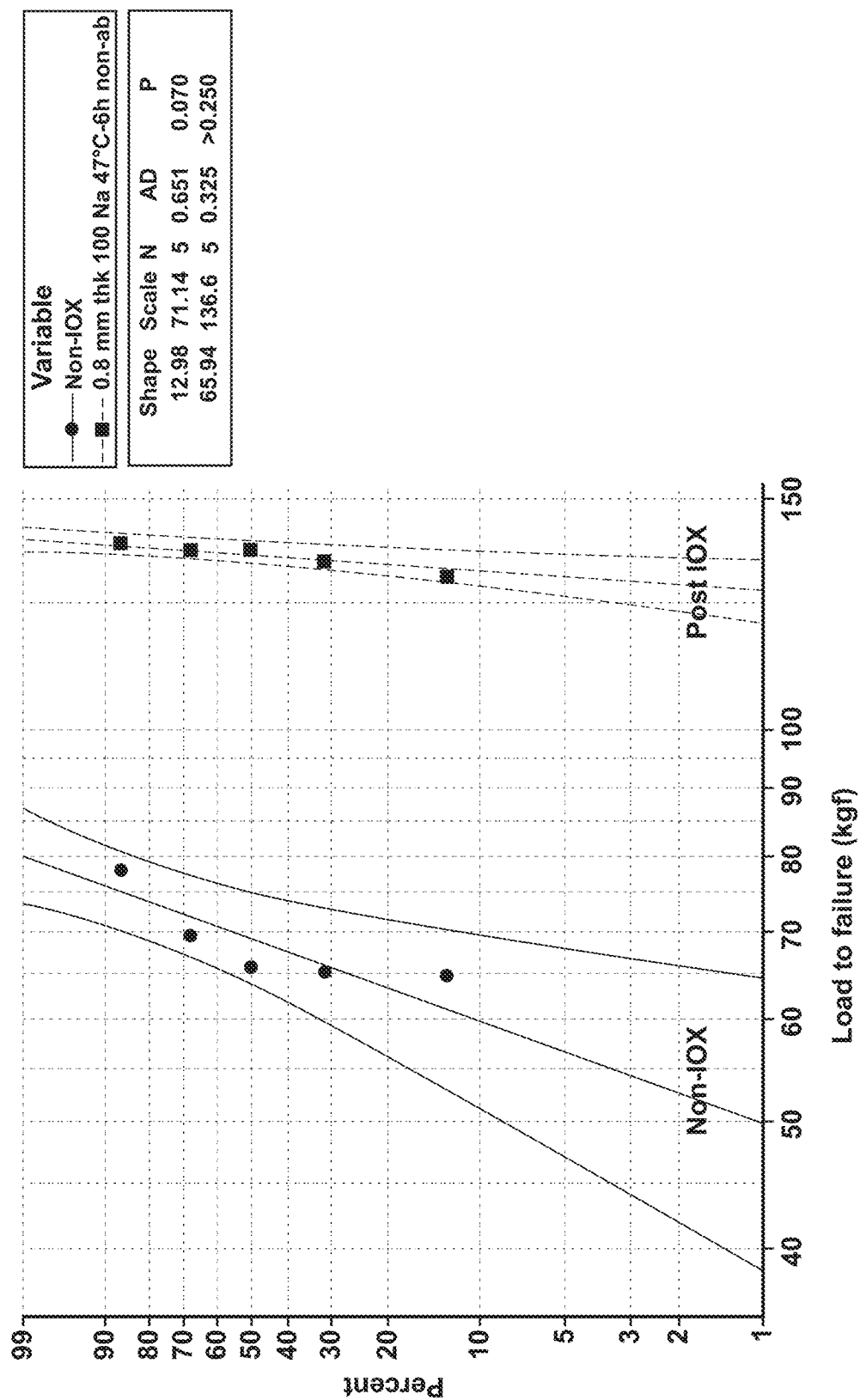
FIG. 7 is a Weibull distribution representing the probability of the glass-ceramic substrates of Example 1E failing in response to various ring-on-ring loads (not having undergone ion-exchange treatment pursuant to a step of the method of FIG. 1) versus the probability of the glass-ceramic articles made from the glass-ceramic substrates of Example 1E failing (having undergone ion-exchange treatment pursuant to a step of the method of FIG. 1)

A fourth sample of the glass-ceramic substrate of Example 1E was subjected to an ion-exchange treatment in a bath of 100 percent $NaNO_3$ at a temperature of 470° C. for a time period of 6 hours. The ring-on-ring load-to-failure was measured. The plot reproduced at FIG. 7 is a Weibull distribution, which represents the probability of glass failure (fracture) due to a given stress. As illustrated, the glass-ceramic substrate (having not undergone the ion-exchange step of the method) is likely to fail in response to loads that are about 50 percent less than the loads likely to cause the glass-ceramic article (having undergone the ion-exchange step of the method) to fail. For the glass-ceramic article of the fourth sample of Example 1E, the load-to-failure is at least 120 kgf.

A series of fifth samples of the glass-ceramic substrate of Example 1E were again (like the fourth sample) subjected to an ion-exchange treatment step in a bath of 100 percent $NaNO_3$ at a temperature of 470° C. for a time period of 6 hours. The resulting glass-ceramic articles were then abraded with SiC particles, each sample being abraded with SiC particles projected at a different air pressure. The abraded samples were then subjected to a ring-on-ring load-to-failure test. The results are graphically reproduced at FIG. 8. The results illustrate that the load-to-failure without abrasion (0 psi) was over 130 kgf, and the load-to-failure with abrasion at 45 psi was over 80 kgf.

Figure 8:
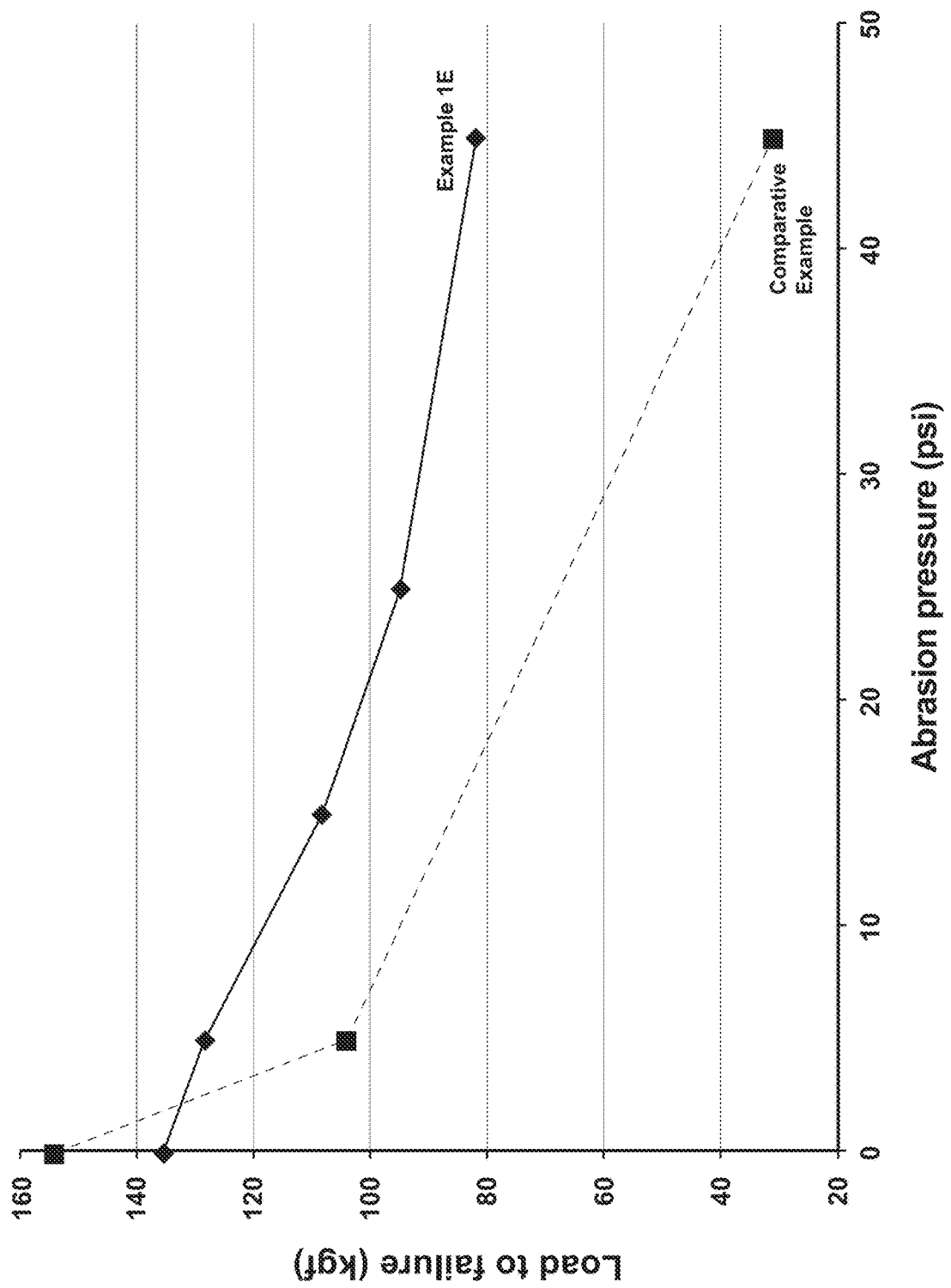
FIG. 8 is a graph of load-to-failure as a function of the pressure at which SiC particles abraded samples of the glass-ceramic substrate of Example 1E, as well as samples of a glass-ceramic substrate of a Comparative Example, illustrating the glass-ceramic substrate of Example 1E retaining more strength after abrasion (i.e., requiring more load-to-failure) than the Comparative Example.

The graph of FIG. 8 additionally includes results for a Comparative Example. The precursor glass of the Comparative Example had a thickness of 0.8 mm and a composition that included 69.2 mol % $SiO_2$, 12.6 mol % $Al_2O_3$, 1.8 mol % $B_2O_3$, 7.7 mol % $Li_2O$, 0.4 mol % $Na_2O$, 2.9 mol % MgO, 1.7 ZnO, 3.5 $TiO_2$, and 0.1 $SnO_2$. The precursor glass was cerammed at a first temperature of 780° C. for a first time period of 2 hours, and then a second temperature of 975° C. for a second time period of 4 hours, resulting in a glass-ceramic substrate. The glass-ceramic substrate had a predominate crystalline phase of β-spodumene, and rutile and gahnite as minor crystalline phases. The glass-ceramic substrate was then ion-exchanged in a pure $NaNO_3$ bath 30 at 390° C. for 3.5 hours, resulting in a glass-ceramic article. The glass-ceramic article was then subjected to the same load-to-failure test, including after abrasion with SiC particles at various air pressures. The results illustrate that, although the Comparative Example had a higher load-to-failure without abrasion (over 150 kgf), the Comparative Example retained less strength at all abrasion pressures tested. For example, after abrasion at a pressure of 45 psi, the glass-ceramic article of the Comparative Example failed at about 30 kgf, whereas the glass-ceramic article of Example 1E failed at over 80 kgf. Without being bound by theory, it is believed that the presence of lithium disilicate as a predominate crystalline phase and the presence of tetragonal $ZrO_2$ as an additional crystalline phase in the glass-ceramic article of Example 1E provided Example 1E with greater retained strength.

Example 1 (continued). Pursuant to the method above, two samples of the glass-ceramic substrate of Example 1 were subjected to an ion-exchange treatment in a bath at a temperature of 470° C. for a period of time of 6 hours. For the first sample, the bath was 100 percent $NaNO_3$. For the second sample, the bath was 99.9 percent by weight $NaNO_3$ and 0.1 percent by weight $LiNO_3$.

An electron microprobe was utilized to characterize composition (particularly $Na_2O$, demonstrative of sodium ions) of the resulting glass-ceramic articles as a function of depth into the thickness of the glass-ceramic articles. A graph of the results is reproduced as FIG. 9. As mentioned above, it is believed that the lithium disilicate crystalline phase near the primary surfaces becomes amorphous, which frees lithium ions to migrate from the glass-ceramic substrate to the bath and thus provides space for sodium ions to migrate from the bath to the glass-ceramic substrate. The result is the relatively large rate of change of mole percentage of $Na_2O$ (i.e., the spike in slope) near the primary surfaces (e.g., from the primary surfaces to 25 μm into the thickness), for the sample ion-exchanged in the bath with pure $NaNO_3$.

Figure 9:
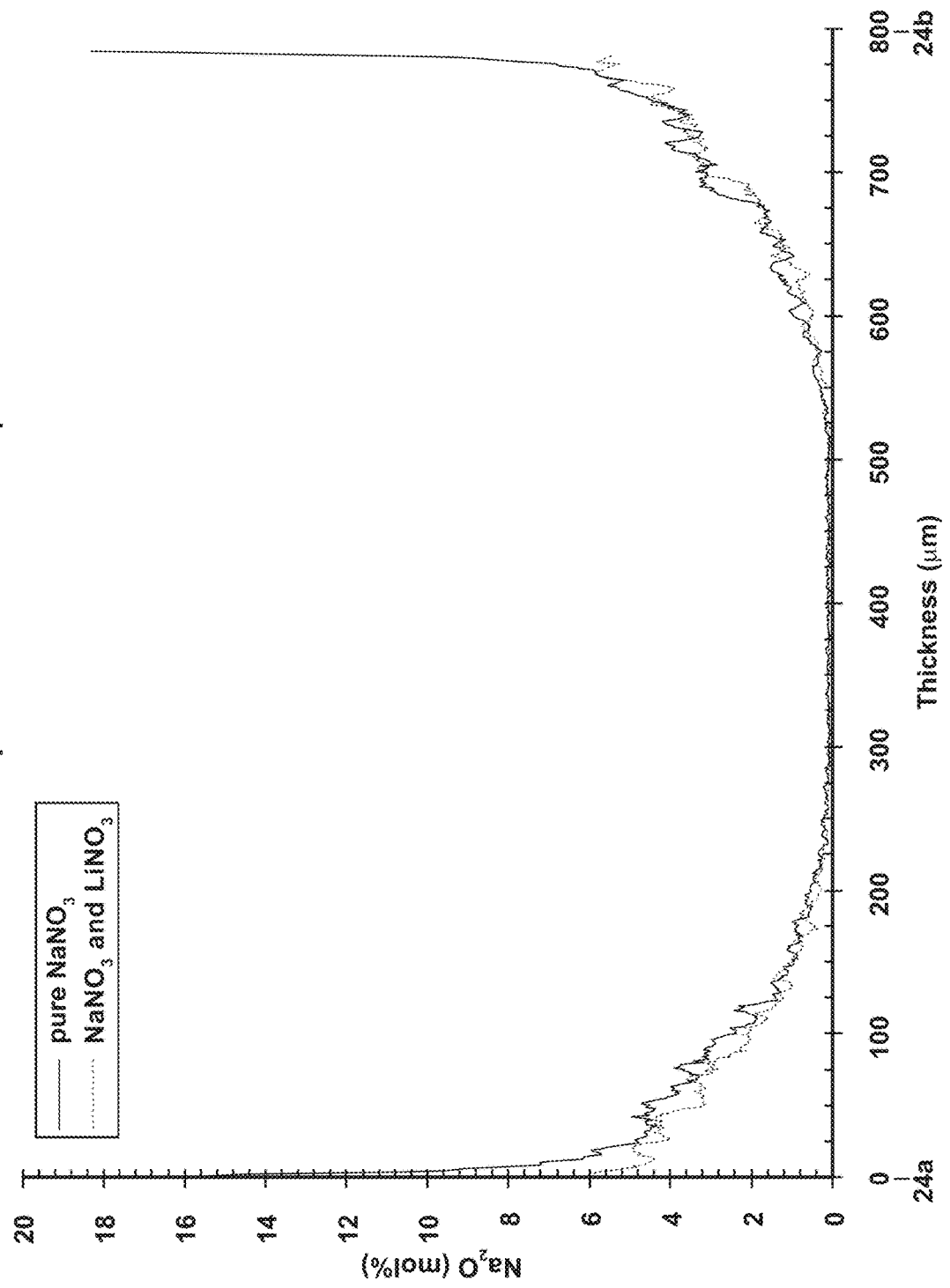
FIG. 9 is a graph characterizing $Na_2O$ as a function of depth into the thickness for two glass-ceramic articles formed from the glass-ceramic substrate of Example 1, each sample using a different bath composition for the ion-exchange treatment, illustrating that, when the bath did not include $LiNO_3$, spikes in the mole percentage as a function of depth into the thickness were generated near the primary surfaces of the glass-ceramic article, but when the bath did include $LiNO_3$, no such spikes occurred.

As the graph of FIG. 9 illustrates for the second sample, including an amount of $LiNO_3$ in the bath suppresses generation of the amorphous layer from the lithium disilicate crystallization phase. Accordingly, no spike (i.e., relatively high rate of change in concentration) in the mole percentage of $Na_2O$ near the primary surfaces results. Sodium ions still migrate from the bath into the thickness of the glass-ceramic substrate, resulting here in the presence of sodium ions within the glass-ceramic article to a depth of at least 15 percent (and even 25 percent) of the thickness from the primary surfaces (e.g., at least 120 μm of the 800 μm thickness, or at least 200 μm of the 800 μm thickness). However, there is no relatively large rate of change (i.e., no spike) of concentration of $Na_2O$ near the primary surfaces and the concentration of $Na_2O$ has a maximum of less than 7 mol % (i.e., about 6 mol %), which occurs at or near the primary surfaces.

Additional Examples. Additional glass-ceramic substrates and articles were produced from two similar precursor glass compositions. The analyzed precursor glass compositions are provided in Table 3 below in mol %. It should be noted that $Na_2O$ and $K_2O$ were not purposely added to the glass composition but it is understood that low levels of $Na_2O$ and $K_2O$ may be introduced as contaminants in batch materials.

TABLE 3

| Composition | X | Y |
|---|---|---|
| $SiO_2$ | 70.8 | 69.9 |
| $Al_2O_3$ | 4.2 | 4.2 |
| $P_2O_5$ | 0.9 | 0.8 |
| $Li_2O$ | 21.8 | 22.7 |
| $Na_2O$ | 0.1 | 0.1 |
| $K_2O$ | 0.1 | 0.1 |
| $ZrO_2$ | 1.9 | 2.0 |
| $SnO_2$ | 0.2 | 0.2 |

In addition to the compositional differences reported in Table 3, the glass compositions included differing concentrations of beta-OH, with Composition X having a lower beta-OH concentration than Composition Y. This difference in beta-OH concentration may result in different phase assemblages when cerammed to form glass-ceramic substrates. The difference in beta-OH concentration may be a result of a different concentration of beta-OH in the raw materials utilized to form the melts or due to a difference in melting conditions.

Glass-ceramic substrates were formed by ceramming precursor glasses formed from the compositions of Table 3, and the resulting phase assemblage was determined as described herein, as well as the color coordinates and opacity. The phase assemblage is reported in terms of wt %, and the produced glass-ceramic substrates include a low level of a residual glass phase even when not quantifiable by Rietveld analysis. Additionally, the total amount of crystalline $ZrO_2$ is reported for the samples. The analysis indicated the presence of tetragonal $ZrO_2$. The ceramming treatment and the measurement results are reported in Table 4. All substrates had a thickness of 0.8 mm.

TABLE 4

| Sample | 20 | 21 | 22 | 23 | 24 | 25 |
|---|---|---|---|---|---|---|
| Composition | Y | Y | Y | Y | Y | Y |
| Ceramming Treatment | 700° C.-4 hrs 875° C.-4 hrs | 740° C.-4 hrs 875° C.-4 hrs | 750° C.-4 hrs 875° C.-4 hrs | 760° C.-4 hrs 875° C.-4 hrs | 780° C.-4 hrs 875° C.-4 hrs | 800° C.-4 hrs 875° C.-4 hrs |
| Glass | | | | | | |
| $Li_2Si_2O_5$ | 42 | 43 | 43 | 43 | 43 | 43 |
| β-Spodumene | 51 | 51 | 50 | 50 | 50 | 50 |
| $Li_3PO_4$ | 4.1 | 3.5 | 3.6 | 3.6 | 3.5 | 3.7 |
| β-Quartz | | trace | 0.3 | 0.2 | 0.3 | trace |
| Total $ZrO_2$ | 2.5 | 3.1 | 3.4 | 3.3 | 3.4 | 3.6 |
| L* | 94.72 | | 95.87 | 94.42 | 95.89 | 94.84 |
| a* | −0.79 | | −0.59 | −0.66 | −0.60 | −0.65 |
| b* | −0.63 | | 0.07 | −0.32 | −0.06 | −0.47 |
| Opacity | 87 | | 96 | 87 | 96 | 93 |

| Sample | 26 | 27 | 28 | 29 | 30 | 31 |
|---|---|---|---|---|---|---|
| Composition | X | X | X | X | X | X |
| Ceramming Treatment | 700° C.-4 hrs 875° C.-4 hrs | 740° C.-4 hrs 875° C.-4 hrs | 750° C.-4 hrs 875° C.-4 hrs | 760° C.-4 hrs 875° C.-4 hrs | 780° C.-4 hrs 875° C.-4 hrs | 800° C.-4 hrs 875° C.-4 hrs |
| Glass | 11 | 10 | 3.8 | | | |
| $Li_2Si_2O_5$ | 37 | 39 | 42 | 43 | 43 | 43 |
| β-Spodumene | 48 | 48 | 49 | 50 | 50 | 50 |
| $Li_3PO_4$ | 3.4 | 3.6 | 3.8 | 3.8 | 3.7 | 3.6 |
| β-Quartz | | | | | | 0.2 |
| Total $ZrO_2$ | | | 1.4 | 3.0 | 3.0 | 3.2 |
| L* | 94.04 | 94.29 | 95.17 | 95.37 | 95.77 | 95.78 |
| a* | −0.82 | −0.77 | −0.62 | −0.58 | −0.61 | −0.63 |
| b* | −0.44 | −0.59 | −0.87 | −1.02 | −0.81 | −0.93 |
| Opacity | 66 | 67 | 88 | 87 | 92 | 92 |

Additional samples Glass-ceramic substrates were formed by ceramming precursor glasses formed from Composition X of Table 3, and the resulting phase assemblage was determined, as well as the color coordinates and opacity. The phase assemblage is reported in terms of wt %, and the produced glass-ceramic substrates include a low level of a residual glass phase even when not quantifiable by Rietveld analysis. Additionally, the total amount of crystalline $ZrO_2$ is reported for the samples. The analysis indicated the presence of tetragonal $ZrO_2$. The Poisson's ratio, shear modulus, Young's modulus, and $K_{1C}$ fracture toughness of the glass-ceramic substrates were also measured. The ceramming treatment and the measurement results are reported in Table 5. All substrates had a thickness of 0.8 mm.

Figure 10:
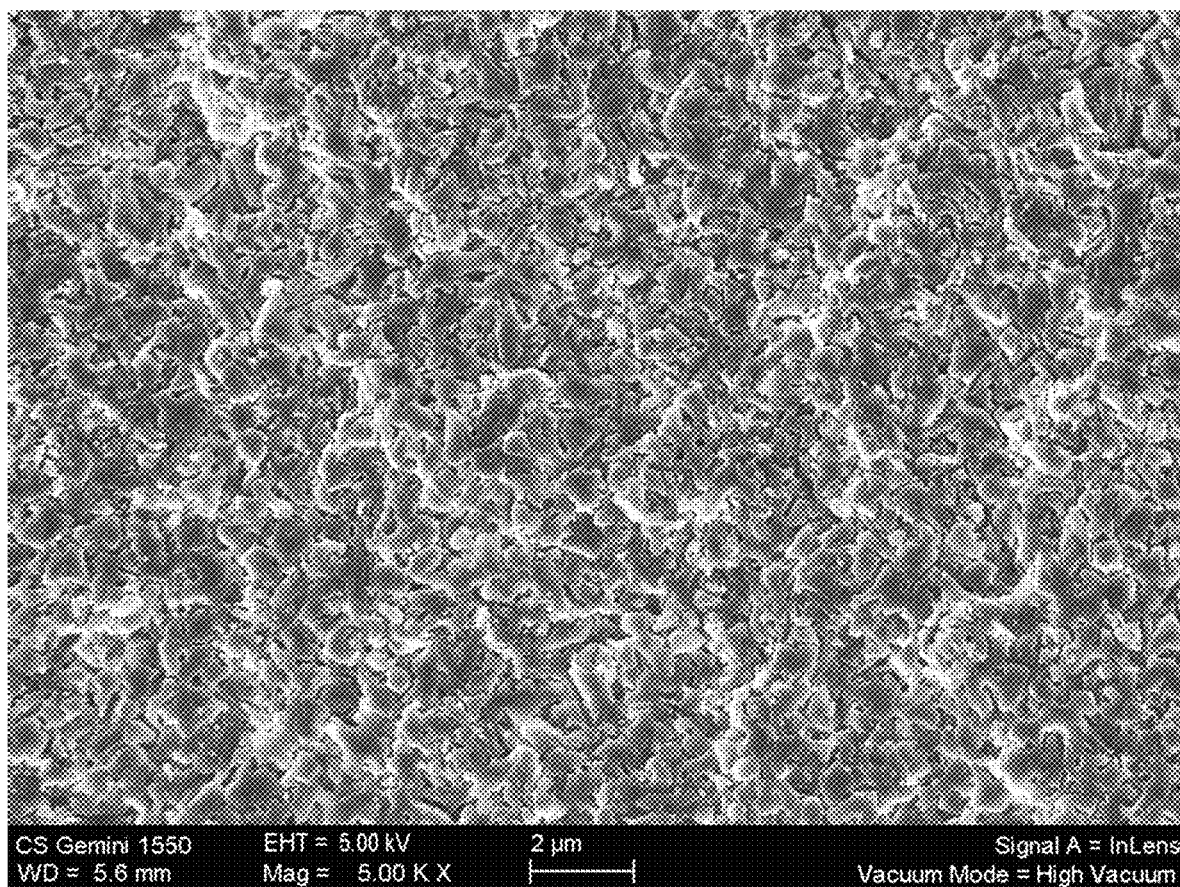
FIG. 10 is a scanning electron microscope (SEM) image of a glass-ceramic substrate according to an embodiment.
Figure 11:
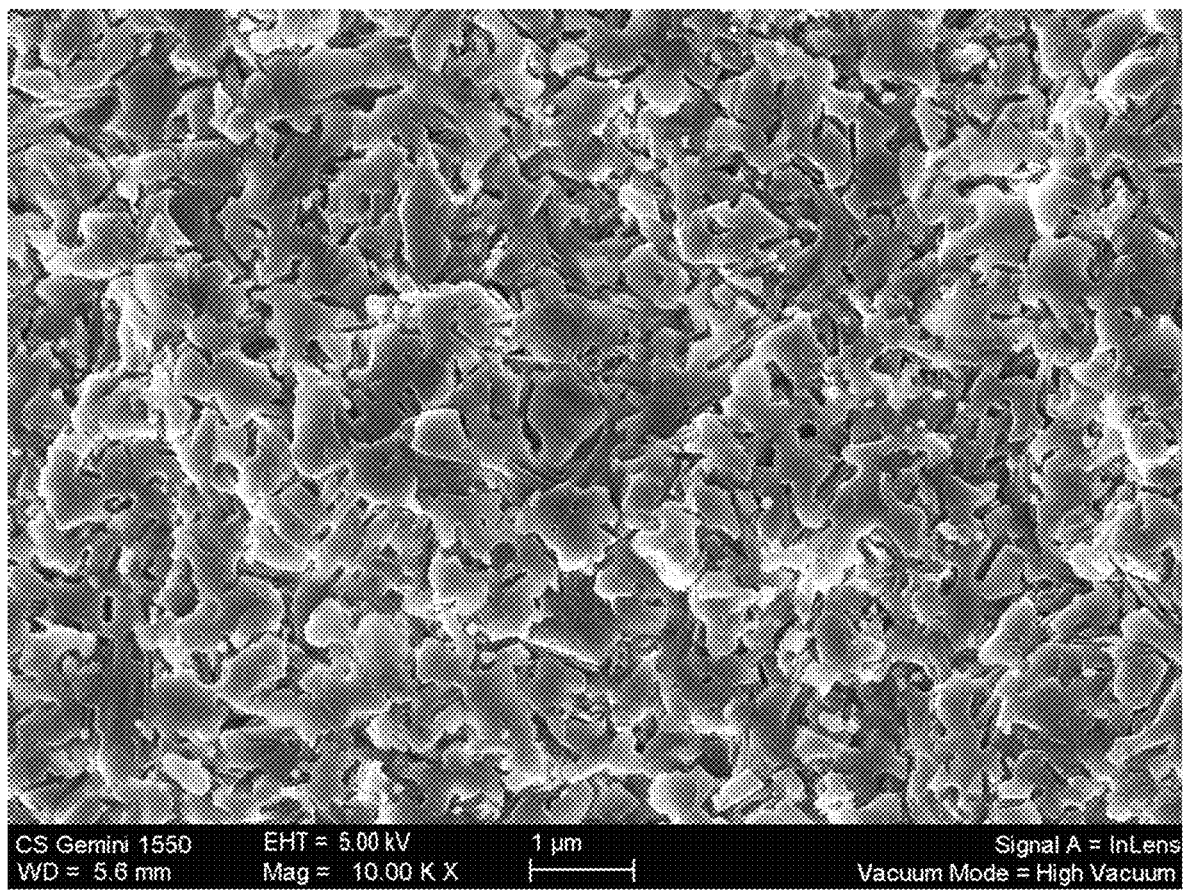
FIG. 11 is a SEM image of the glass-ceramic substrate of FIG. 10 at an increased magnification.

Glass-ceramic substrate Sample 32 was processed by etching to reveal the crystalline phases to prepare for SEM analysis. The resulting SEM images are provided in FIGS. 10 and 11, with FIG. 11 being at a higher magnification.

To demonstrate the chemical strengthening ability of the glass-ceramic substrates, glass-ceramic substrates according to Sample 32 with various thicknesses were ion exchanged to form glass-ceramic articles that include a stress profile, as reported in Table 6 below. The ion exchange was performed by submerging the glass-ceramic substrates in a molten salt bath, with the submersion time and bath temperatures reported in Table 6. The molten salt bath included 40% $NaNO_3$, 60% $KNO_3$, and 0.1% $LiNO_3$, by weight. Comparative glass-ceramic article substrate examples were also ion exchanged. The comparative examples were produced

TABLE 5

| Sample | 32 | 33 | 34 | 35 | 36 | 37 |
|---|---|---|---|---|---|---|
| Composition | X | X | X | X | X | X |
| Ceramming Treatment | 800° C.-4 hrs 875° C.-4 hrs | 700° C.-4 hrs 850° C.-4 hrs | 760° C.-4 hrs 850° C.-4 hrs | 700° C.-4 hrs 875° C.-4 hrs | 760° C.-4 hrs 875° C.-4 hrs | 700° C.-4 hrs 890° C.-4 hrs |
| Glass | | | | 10.5 | | 11.5 |
| $Li_2Si_2O_5$ | 42.0 | 42.0 | 42.6 | 36.4 | 42.9 | 36.0 |
| β-Spodumene | 51.0 | 51.6 | 48.0 | 49.2 | 49.9 | 48.5 |
| $Li_2PO_4$ | 3.7 | 4.0 | 3.8 | 3.4 | 4.0 | 3.4 |
| β-Quartz | 0.2 | | 1.0 | | | |
| Virgilite | | | 1.0 | | | |
| Total $ZrO_2$ | 3.1 | 2.4 | 3.7 | 0.4 | 3.2 | 0.6 |
| Poisson's Ratio | 0.238 | 0.233 | 0.232 | 0.232 | 0.238 | 0.239 |
| Shear Modulus (Mpsi) | 5.64 | 5.63 | 5.70 | 5.58 | 5.62 | 5.59 |
| Young's Modulus (Mpsi) | 13.97 | 13.88 | 14.03 | 13.75 | 13.91 | 13.85 |
| $K_{IC}$ (MPa · m$^{1/2}$) | 1.541 | 1.415 | 1.409 | 1.447 | 1.535 | 1.564 |

| Sample | 38 | 39 | 40 | 41 |
|---|---|---|---|---|
| Composition | X | X | X | X |
| Ceramming Treatment | 760° C.-4 hrs 890° C.-4 hrs | 760° C.-4 hrs 825° C.-4 hrs | 800° C.-4 hrs 890° C.-4 hrs | 800° C.-4 hrs 950° C.-4 hrs |
| Glass | | | | |
| $Li_2Si_2O_5$ | 41.9 | | | |
| β-Spodumene | 51.3 | | | |
| $Li_2PO_4$ | 4.0 | | | |
| β-Quartz | | | | |
| Virgilite | | | | |
| Total $ZrO_2$ | 2.7 | | | |
| Poisson's Ratio | 0.237 | | | |
| Shear Modulus (Mpsi) | 5.63 | | | |
| Young's Modulus (Mpsi) | 13.93 | | | |
| $K_{IC}$ (MPa · m$^{1/2}$) | 1.655 | 1.308 | 1.720 | 1.812 | from a glass having Composition X and were cerammed under conditions that produced a glass-ceramic article with a transparent appearance.

TABLE 6

| Sample | | 32A | 32B | 32C | Comp. Ex. 1 | Comp. Ex. 2 | Comp. Ex. 3 |
|---|---|---|---|---|---|---|---|
| Thickness(mm) | | 0.8 | 0.8 | 0.4 | 0.8 | 0.4 | 0.4 |
| Ion Exchange Treatment | Temperature (° C.) | 500 | 470 | 470 | 500 | 500 | 500 |
| | Time(hrs) | 8 | 9 | 3.5 | 8 | 4 | 4.5 |

Figure 12:
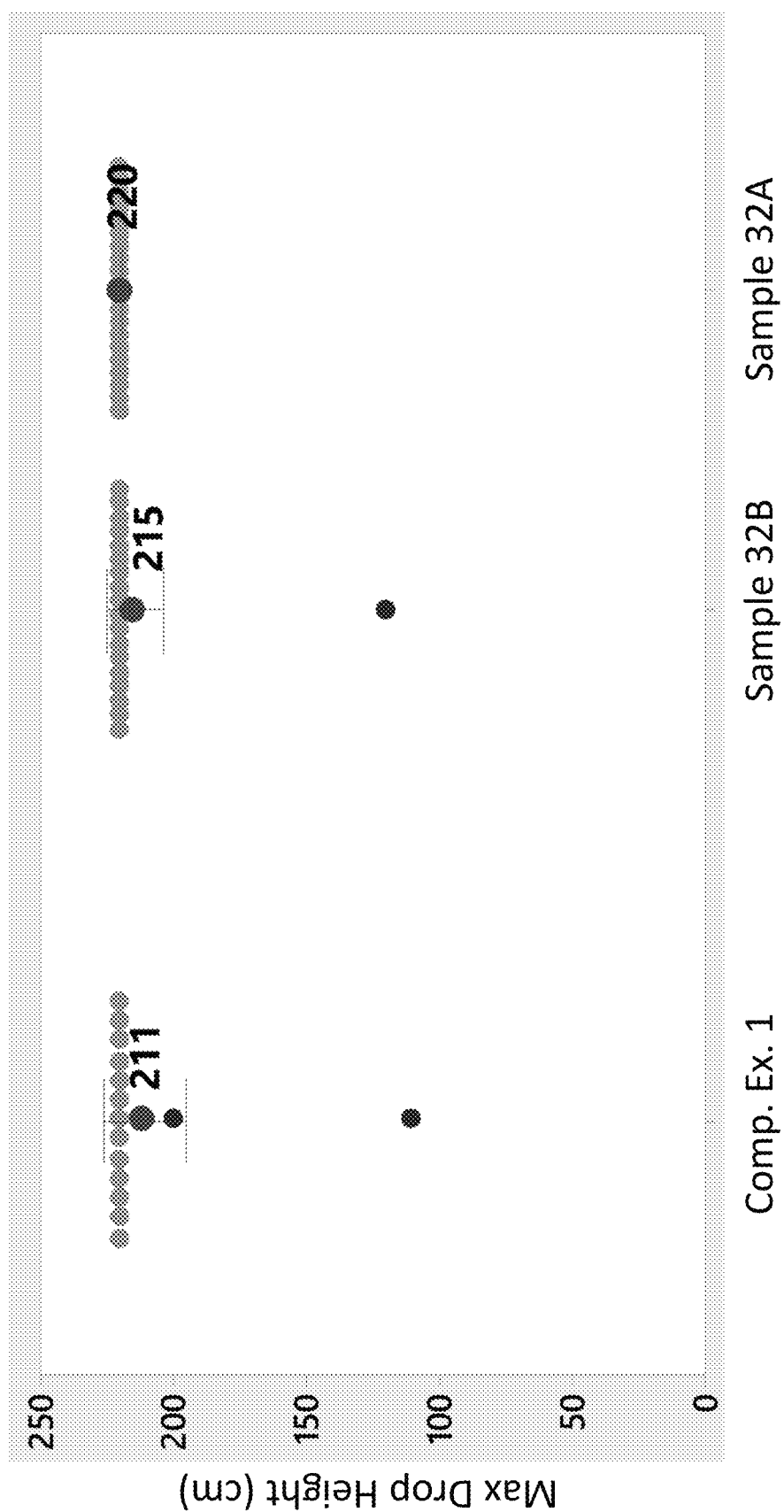
FIG. 12 is a graph of the results of a drop test of glass-ceramic articles according to embodiments and a comparative example onto 80 grit sandpaper.
Figure 13:
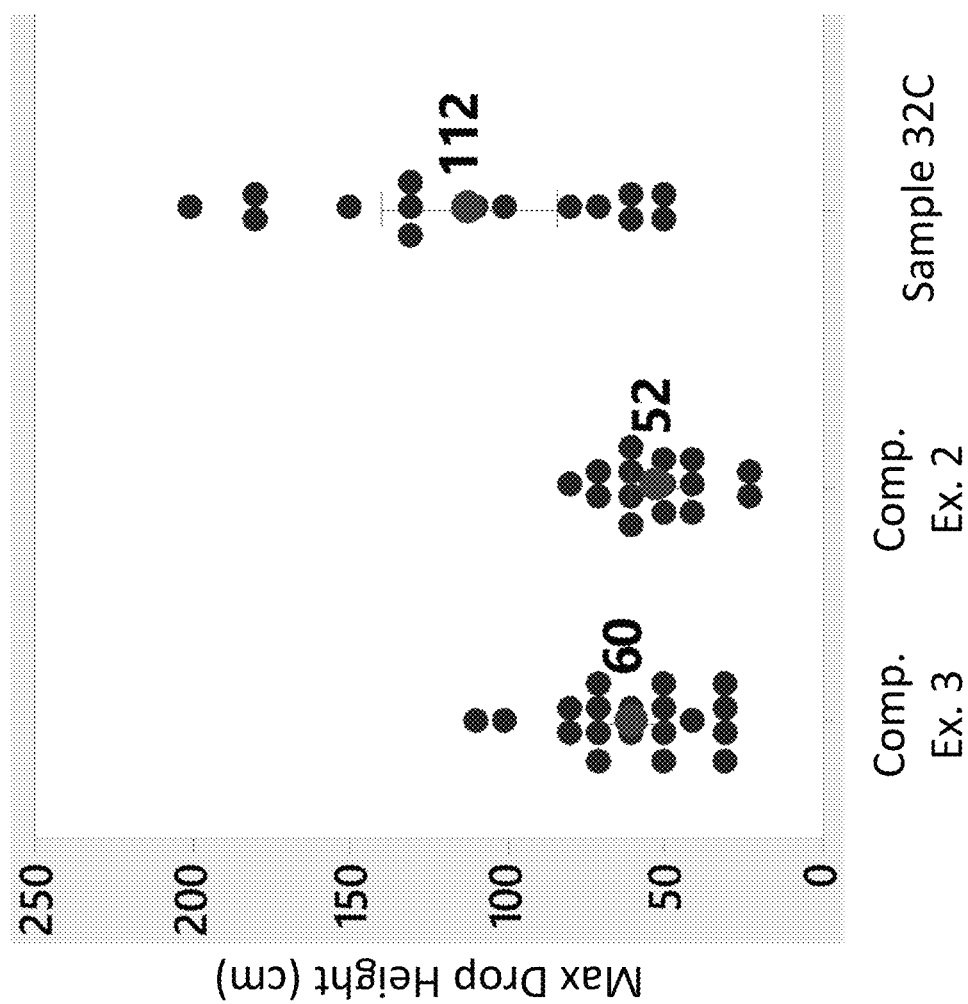
FIG. 13 is a graph of the results of a drop test of a glass-ceramic article according to embodiments and comparative examples onto 80 grit sandpaper.
Figure 14:
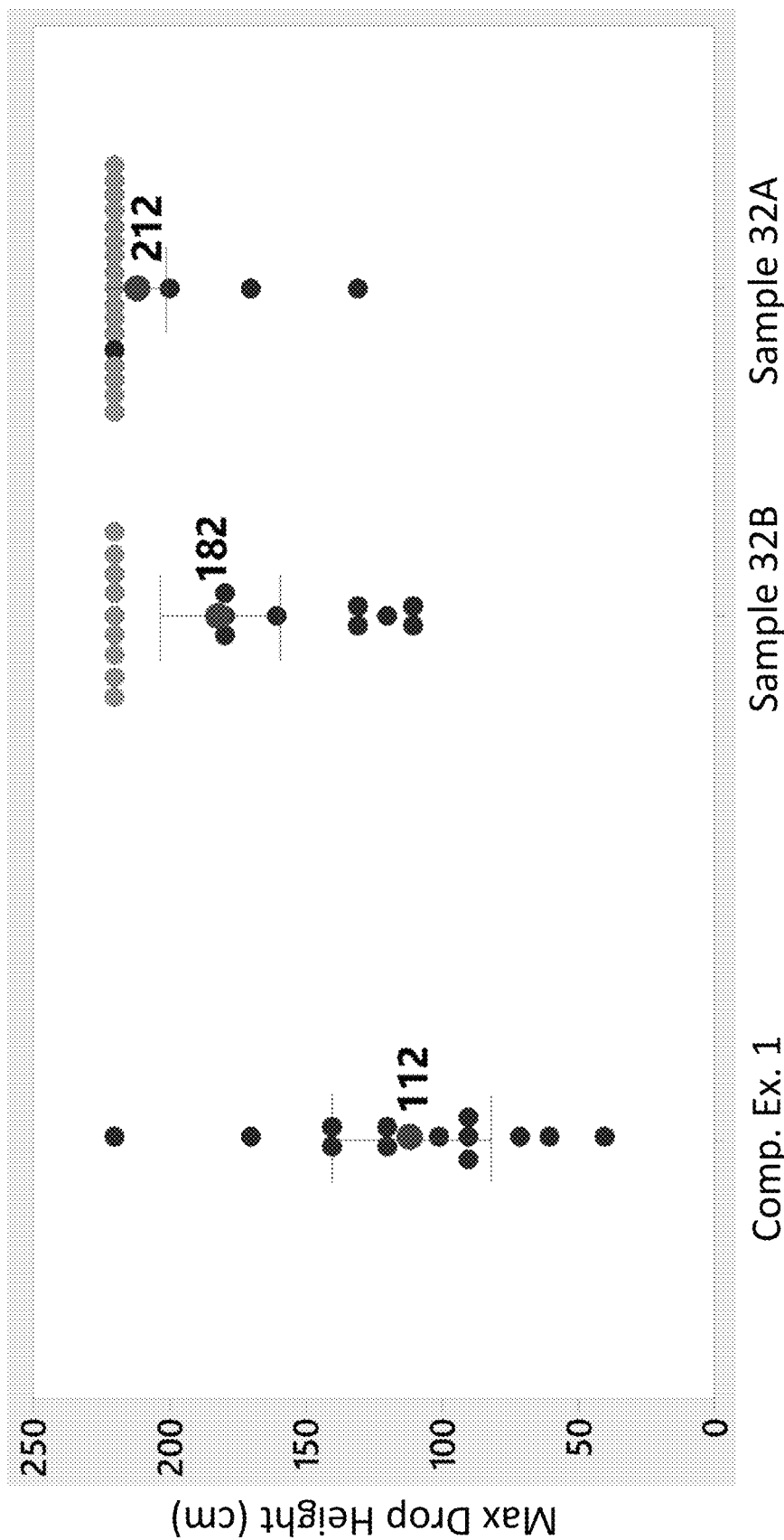
FIG. 14 is a graph of the results of a drop test of glass-ceramic articles according to embodiments and a comparative example onto 30 grit sandpaper.

The ion exchanged samples were then placed in a sample holder simulating a cover glass in a mobile electronic device and dropped from incrementally higher heights such that the sample contacts a sandpaper covered surface. The maximum drop height prior to sample failure was recorded for a number of samples and a mean maximum drop height was calculated. The results of the drop test where 80 grit sandpaper was employed are reported in FIGS. 12 and 13, and the results of the drop test where 30 grit sandpaper was employed are reported in FIG. 14.

Variations and modifications may be made to the above-described embodiments of the disclosure without departing substantially from the spirit and various principles of the disclosure. All such modifications and variations are intended to be included herein within the scope of this disclosure and protected by the following claims.

What is claimed is:

1. A glass-ceramic article comprising:
a composition at a center-volume comprising, on an oxide basis:
55-75 mol % $SiO_2$;
0.2-10 mol % $Al_2O_3$;
0-5 mol % $B_2O_3$;
15-30 mol % $Li_2O$;
0-2 mol % $Na_2O$;
0-2 mol % $K_2O$;
0-5 mol % $MgO$;
0-2 mol % $ZnO$;
0.2-3.0 mol % $P_2O_5$;
0.1-10 mol % $ZrO_2$;
0-4 mol % $TiO_2$; and
0-1.0 mol % $SnO_2$;
wherein (i) lithium disilicate and (ii) either β-spodumene or β-quartz are the two predominant crystalline phases (by weight) of the glass-ceramic article;
wherein the glass-article further comprises tetragonal $ZrO_2$ as a crystalline phase; and
wherein one of the following is true: (i) the composition of the glass-ceramic article from a primary surface into a thickness of the glass-ceramic article comprises over 10 mol % $Na_2O$, with the mole percentage of $Na_2O$ decreasing from the primary surface towards the center-volume (ii) the mole percentage of $Na_2O$ within the glass-ceramic article decreases as a function of depth into the thickness of the glass-ceramic article from the primary surface, with the maximum mole percentage of $Na_2O$ at any depth being 7 mol % $Na_2O$, and sodium ions are present within the glass-ceramic article to a depth of at least 15 percent of the thickness from the primary surface.

2. The glass-ceramic article of claim 1, wherein:
the mole percentage of $Na_2O$ within the glass-ceramic article decreases as a function of depth into the thickness of the glass-ceramic article from the primary surface, with the maximum mole percentage of $Na_2O$ at any depth being 7 mol % $Na_2O$ and, and sodium ions are present within the glass-ceramic article to a depth of at least 15 percent of the thickness from the primary surface.

3. The glass-ceramic article of claim 1, wherein:
the glass-ceramic article exhibits a ring-on-ring load-to-failure of at least 120 kgf.

4. The glass-ceramic article of claim 1, wherein:
after being abraded with SiC particles at an abrasion pressure of 45 psi, the glass-ceramic article exhibits a ring-on-ring load-to-failure of at least 80 kgf.

5. The glass-ceramic article of claim 1, wherein:
the composition of the glass-ceramic article at the center-volume comprises, on an oxide basis:
68.6-71.5 mol % $SiO_2$;
1.0-4.5 mol % $Al_2O_3$;
21.5-22.2 mol % $Li_2O$;
0.7-1.2 mol % $P_2O_5$;
1.5-5.0 mol % $ZrO_2$; and
0-0.1 mol % $SnO_2$, wherein the glass-ceramic article is substantially free of $B_2O_3$; $MgO$; $ZnO$; and $TiO_2$.

6. The glass-ceramic article of claim 1, wherein:
the composition of the glass-ceramic article at the center-volume comprises, on an oxide basis:
68.6-70.9 mol % $SiO_2$;
1.0-4.3 mol % $Al_2O_3$;
21.5-22.2 mol % $Li_2O$;
0.9-1.2 mol % $P_2O_5$;
2.0-5.0 mol % $ZrO_2$; and
0-1.0 mol % $SnO_2$, wherein the glass-ceramic article is substantially free of $B_2O_3$; $MgO$; $ZnO$; and $TiO_2$.

7. The glass-ceramic article of claim 1, wherein:
the composition of the glass-ceramic article at the center-volume comprises (on an oxide basis):
68.6-70.9 mol % $SiO_2$;
1.0-4.3 mol % $Al_2O_3$;
21.5-22.2 mol % $Li_2O$;
0.9-1.2 mol % $P_2O_5$;
2.0-5.0 mol % $ZrO_2$; and
0-1.0 mol % $SnO_2$.

8. The glass-ceramic article of claim 1, wherein:
the glass-ceramic article exhibits a color, under an F02 illuminant, presented in CIELAB color space coordinates:
L* : 93 to 97;
a* : −1.0 to 0; and
b* : −1.0 to 3.0.

9. The glass-ceramic article of claim 1, wherein:
the glass-ceramic substrate has an average opacity of 79 to 96 percent throughout the wavelength range of 400 nm to 700 nm for a thickness of 0.8 mm.

10. The glass-ceramic article of claim 1, wherein:
the composition of the glass-ceramic article at the center-volume comprises, on an oxide basis, 3.4 to 4.3 mol % $Al_2O_3$; and lithium disilicate and β-spodumene are the two predominant by weight crystalline phases of the glass-ceramic article.

11. A glass-ceramic article comprising:
a composition at a center-volume comprising, on an oxide basis:
70.0-70.6 mol % $SiO_2$;
4.85-4.95 mol % $Al_2O_3$;
19.2-19.4 mol % $Li_2O$;
0.195-0.205 mol % $Na_2O$;
0.9-1.1 mol % $P_2O_5$;
1.8-2.6 mol % $ZrO_2$;
1.9-2.1 mol % $TiO_2$; and
0.09-0.11 mol % $SnO_2$,
wherein the glass-ceramic article at the center-volume is substantially free of $B_2O_3$; $K_2O$; MgO; and ZnO;
lithium disilicate and β-spodumene are the two predominant crystalline phases by weight of the glass-ceramic article;
wherein the glass-article further comprises tetragonal $ZrO_2$ as a crystalline phase; and
wherein one of the following conditions are true:
  (i) the composition of the glass-ceramic article from a primary surface into a thickness of the glass-ceramic article comprises over 10 mol % $Na_2O$, on an oxide basis, with the mole percentage of $Na_2O$ decreasing from the primary surface towards the center-volume; and
  (ii) the mole percentage of $Na_2O$ within the glass-ceramic article decreases as a function of depth into the thickness of the glass-ceramic article from the primary surface, with the maximum mole percentage of $Na_2O$ at any depth being 7 mol % $Na_2O$, and sodium ions are present within the glass-ceramic article to a depth of at least 15 percent of the thickness from the primary surface.

12. The glass-ceramic article of claim 11, wherein:
the composition of the glass-ceramic article from the primary surface into the thickness of the glass-ceramic article comprises over 10 mol % $Na_2O$, with the mole percentage of $Na_2O$ decreasing from the primary surface towards the center-volume.

13. The glass-ceramic article of claim 11, wherein:
the mole percentage of $Na_2O$ within the glass-ceramic article decreases as a function of depth into the thickness of the glass-ceramic article from the primary surface, with the maximum mole percentage of $Na_2O$ at any depth being 7 mol % $Na_2O$ and, and sodium ions are present within the glass-ceramic article to a depth of at least 15 percent of the thickness from the primary surface.

14. The glass-ceramic article of claim 11, wherein:
the glass-ceramic article exhibits a ring-on-ring load-to-failure of at least 120 kgf.

15. The glass-ceramic article of claim 11, wherein:
after being abraded with SiC particles at an abrasion pressure of 45 psi, the glass-ceramic article exhibits a ring-on-ring load-to-failure of at least 80 kgf.

16. The glass-ceramic article of claim 11, wherein:
the glass-ceramic article exhibits a color, under an F02 illuminant, presented in CIELAB color space coordinates:
$L^*$ : 93 to 97;
$a^*$ : −1.0 to 0; and
$b^*$ : −1.0 to 3.0.

17. The glass-ceramic article of claim 11, wherein:
the glass-ceramic substrate has an average opacity of 79 to 96 percent throughout the wavelength range of 400 nm to 700 nm for a thickness of 0.8 mm.

18. The glass-ceramic article of claim 1, wherein the composition of the glass-ceramic article from the primary surface into the thickness of the glass-ceramic article comprises over 10 mol % $Na_2O$, with the mole percentage of $Na_2O$ decreasing from the primary surface towards the center-volume.

* * * * *

UNITED STATES PATENT AND TRADEMARK OFFICE
CERTIFICATE OF CORRECTION

PATENT NO. : 11,724,961 B2
APPLICATION NO. : 17/358818
DATED : August 15, 2023
INVENTOR(S) : Carol Ann Click et al.

It is certified that error appears in the above-identified patent and that said Letters Patent is hereby corrected as shown below:

In the Claims

In Column 30, Line 3, in Claim 2, delete "$Na_2O$ and, and" and insert -- $Na_2O$, and --.

In Column 32, Line 9, in Claim 13, delete "$Na_2O$ and, and" and insert -- $Na_2O$, and --.

Signed and Sealed this
Sixteenth Day of July, 2024

Katherine Kelly Vidal
*Director of the United States Patent and Trademark Office*